United States Patent [19]

Iwanaga et al.

[11] 4,257,441
[45] Mar. 24, 1981

[54] TRANSMISSION THROTTLE VALVE OF AUTOMATIC POWER TRANSMISSION

[75] Inventors: Kazuyoshi Iwanaga, Yokohama; Kazuhiko Sugano, Tokyo; Kunio Ohtsuka, Yokohama, all of Japan

[73] Assignee: Nissan Motor Company, Limited, Yokohama, Japan

[21] Appl. No.: 968,719

[22] Filed: Dec. 12, 1978

[30] Foreign Application Priority Data

Aug. 25, 1978 [JP] Japan ................... 53-102874

[51] Int. Cl.³ .......................... G05D 16/10
[52] U.S. Cl. ................... 137/116.3; 74/867
[58] Field of Search ............ 74/867, 868, 869; 137/116.3, 495

[56] References Cited

U.S. PATENT DOCUMENTS

| 3,143,127 | 8/1964 | Frost | 137/116.3 |
| 3,171,433 | 3/1965 | Borman | 137/116.3 X |
| 3,227,172 | 1/1966 | Sims | 137/116.3 |
| 3,840,039 | 10/1974 | Shellman | 137/116.3 |

Primary Examiner—Robert G. Nilson
Attorney, Agent, or Firm—Schwartz, Jeffery, Schwaab, Mack, Blumenthal & Koch

[57] ABSTRACT

A transmission throttle valve for use in a hydraulic control system of an automotive automatic power transmission, comprising a valve plunger movable with the accelerator pedal of an automotive vehicle and, a valve spool engaging the valve plunger through a spring urging the valve plunger and the valve spool to axially move in opposite directions relative to each other for producing a fluid pressure variable with the displacement of the accelerator pedal, wherein the valve spool is formed with an axial bore open at both ends and has the valve plunger slidably passed through the bore while the valve plunger is formed with a laterally enlarged axial portion forming a variable-volume space in which the fluid pressure developed by the transmission throttle valve is to be admitted to urge the valve plunger to axially move against the force of the spring so as to save the driver's effort for depressing the accelerator pedal.

2 Claims, 5 Drawing Figures

4,257,441

TRANSMISSION THROTTLE VALVE OF AUTOMATIC POWER TRANSMISSION

FIELD OF THE INVENTION

The present invention relates to a hydraulic control system for the transmission mechanism of an automatic power transmission for an automotive vehicle and, more particularly, to a transmission throttle valve to form part of such a control system.

BACKGROUND OF THE INVENTION

A hydraulic control system of an automatic power transmission for an automotive vehicle includes, in addition to a pressure regulator for producing a main control or line pressure, a transmission throttle valve which is adapted to produce a throttle pressure continuously variable with load on the entine with which the transmission is used together in an automotive vehicle. Among the transmission throttle valves presently in practical use, there is a throttle valve which is responsive to the movement of the accelerator pedal of a vehicle for producing a throttle pressure variable with the degree to which the throttle valve provided in the carburetor of the engine is open. A transmission throttle valve of this nature usually comprises a valve plunger connected to or engaged by the accelerator pedal through a mechanical linkage provided therebetween and a valve spool arranged in series with the valve plunger and engageable with the valve plunger through a spring provided between the valve spool and plunger. In the presence of a line pressure in one fluid inlet port of the throttle valve, the valve spool is not only subjected at one end thereof to the force of the spring but acted upon at the other end thereof by a fluid pressure which is developed by the valve spool attempting to attain a certain equilibrium position in which the force resulting from the fluid pressure urging the valve spool against the force of the spring is substantially equally balanced with the force of the spring. The mechanical linkage provided between the valve plunger and the accelerator pedal is arranged so that the valve plunger is continuously movable with the accelerator pedal. As the accelerator pedal is depressed from the released position thereof, the valve plunger is axially moved toward the valve spool and compress the spring provided between the valve spool and plunger. The force of the spring exerted on the valve spool is thus continuously variable with the distance of movement of the accelerator pedal and is therefore representative of the opening degree of the carburetor throttle valve. Thus, the throttle pressure developed by the transmission throttle valve is a function of the opening degree of the carburetor throttle valve and is variable as the accelerator pedal is moved between the released position and a fully depressed or kickdown position thereof.

When the accelerator pedal is in a condition being depressed by the vehicle driver, the force of the spring intervening between the valve plunger and valve spool of the transmission throttle valve is transmitted to the accelerator pedal through the valve plunger and the mechanical linkage between the valve plunger and the accelerator pedal. The force being applied to the accelerator pedal by a vehicle driver is therefore opposed by the force thus carried over to the accelerator pedal from the transmission throttle valve so that the vehicle driver must depressed the accelerator pedal against such an opposing force. The force opposing the driver's effort to depress the accelerator pedal increases as the accelerator pedal is depressed deeper because the force of the spring between the valve plunger and spool of the transmission throttle valve becomes larger as the valve plunger is moved toward the valve spool.

With a view to providing a solution to this problem encountered in a transmission throttle valve of the described type, it has been proposed that the valve plunger of the throttle valve be provided with a laterally or radially enlarged axial portion forming a pressure acting area to be acted upon by a fluid pressure for urging the valve plunger to move toward the valve spool against the force of the spring between the valve plunger and spool, viz., in a direction in which the valve plunger is to be axially moved when the accelerator pedal is depressed by a vehicle driver. Formation of such an axial portion inevitably gives rise to an increase in the axial length of the valve spool and results in the more elongation of the whole construction of the transmission throttle valve which tends to be elongated because of the valve plunger and spool which are arranged in series.

In order, furthermore, that the pressure acting area thus formed on the valve plunger be constantly acted upon by a fluid pressure independently of the relative movement between the valve plunger and spool, a tubular member must be provided through which the valve plunger is to be axially moved back and forth when the accelerator pedal is depressed and released. Provision of such an additional member arises not only a problem in that the member adds to the number of the component parts of the transmission throttle valve but a problem in that, since the tubular member is also subjected to the fluid pressure acting on the enlarged axial portion of the valve plunger, further additional means are required to prevent the tubular member from being dislodged from a predetermined axial position relative to the valve body structure supporting the valve plunger. All these arrangements are responsible for the complicated and costly construction of the transmission throttle valve of the described type.

The present invention contemplates provision of an improved transmission throttle valve which is sufficiently small in axial length and simple in construction and which is nevertheless reliably operable for alleviating the resistance which a vehicle driver encounters when in depressing the accelerator pedal in an automotive vehicle using an automatic power transmission including a transmission throttle valve of the described basic nature.

SUMMARY OF THE INVENTION

In accordance with the present invention, there is provided in a hydraulic control system of an automatic power transmission for an automatic power transmission for an automotive vehicle including an acceleration producing member movable into and out of a released position, a transmission throttle valve for producing a fluid pressure variable with the displacement of the acceleration producing member from the released position thereof, comprising a wall portion formed with a valve chamber having at least one open axial end; a first movable member axially slidable through the valve chamber and formed with an axial bore which is open at both ends, the first movable member having a pressure acting area to be acted upon by the aforesaid fluid pressure; a second movable member axially slidable through the bore in the first movable member and mechanically engaging the acceleration producing member for being axially moved in a predetermined direction with respect to the wall portion; and resilient biasing means engaging the first and second movable members for urging the first and second movable members to axially move in opposite directions relative to each other, the direction in which the second movable member is urged to move by the biasing means being coincident with the aforesaid predetermined direction, the second movable member having a laterally enlarged axial portion axially slidable in the abovementioned valve chamber and forming a variable-volume space between the enlarged axial portion and the aforesaid pressure acting area of the first movable member.

DESCRIPTION OF THE DRAWINGS

Further detailed features and advantages of a transmission throttle valve proposed by the present invention will be made in the following description taken in conjunction with the following drawings, in which.

DETAILED DESCRIPTION OF THE INVENTION

Power Transmission Mechanism—General Construction

Figure 1:
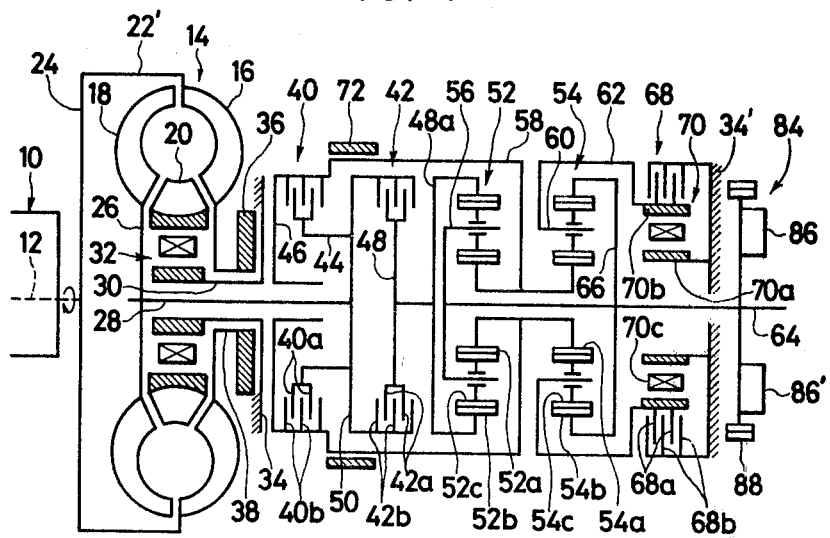
FIG. 1 is a schematic view showing the general construction of a transmission mechanism with which a hydraulic control system including a transmission throttle valve embodying the present invention may be incorporated into an automatic power transmission of an automotive vehicle.

Description will be hereinafter made regarding the general construction and arrangement of a representative example of an automatic power transmission mechanism to which a hydraulic control system embodying the present invention is to be applied. The transmission mechanism forms part of the power train of an automotive vehicle equipped with a power plant such as an internal combustion engine 10 having a crankshaft 12 as the power output delivering member as partially and schematically illustrated in FIG. 1 of the drawings and is operatively connected to the crankshaft 12 of the engine 10 through a hydrodynamic torque converter 14. The torque converter 14 is herein assumed to be of the three member design by way of example and is thus shown comprising a driving member or pump impeller 16, a driven member or turbine runner 18, and a reaction member or stator 20 as is well known in the art. The pump impeller 16 is connected by a converter cover 22 and a converter driving plate 24 to the crankshaft 12 of the engine 10 and is rotatable with the engine crankshaft 12 about an axis which is aligned with the axis of rotation of the crankshaft 12. The turbine runner 18 is mounted on a turbine support disc 26 which is keyed or splined to a transmission input shaft 28 having a center axis which is also aligned with the axis of rotation of the engine crankshaft 12. The stator 20 serving as the reaction member of the torque converter 14 is positioned between the pump impeller 16 and the turbine runner 18 thus arranged and is mounted on a stator support hollow shaft 30 through a torque converter one-way clutch assembly 32. The stator support hollow shaft 30 has the transmission input shaft 28 axially passed therethrough in substantially coaxial relationship and is fixedly connected to or forms part of a stationary wall structure 34. The stator 20 is permitted to rotate about the center axis of the transmission input shaft 28 in the same direction as the direction of rotation the pump impeller 16 of the torque converter 14 and accordingly as the direction of rotation of the engine crankshaft 12. Though not shown, each of the pump impeller 16, turbine runner 18 and stator 20 of the torque converter 14 has a number of vanes arranged and inclined in symmetry about the center axis of the transmission input shaft 28. Behind the torque converter 14 thus constructed and arranged is positioned a transmission oil pump assembly 36 including, though not shown, an oil pump body bolted or otherwise secured to the above mentioned stationary wall structure 34 and a drive gear keyed or splined to an oil pump support sleeve 38 coaxially surrounding and rotatable on the outer peripheral surface of the stator support hollow shaft 30 and welded or otherwise securely connected to the pump impeller 16 of the torque converter 14.

When the engine 10 is in operation, the driving power produced by the engine is delivered from the crankshaft 12 of the engine 10 to the pump impeller 16 of the torque converter 14 through the converter driving plate 24 and the converter cover 22 and is transmitted from the pump impeller 16 to the transmission input shaft 28 through the turbine runner 18 of the torque converter 14 with a torque multiplied by means of the stator 20 at a ratio which is variable with the ratio between the revolution speed of the engine crankshaft 21 driving the pump impeller 16 and the revolution speed of the transmission input shaft 28 driven by the turbine runner 18 of the torque converter 14, as is well known in the art. The pump impeller 16 of the torque converter 14 drives not only the turbine runner 18 of the torque converter but the transmission oil pump assembly 36 through the pump support sleeve 38 so that the oil pump assembly 36 delivers oil under pressure which is also variable with the revolution speed of the crankshaft 12 of the engine 10.

The power transmission mechanism herein shown is assumed to be of the three forward speed and one reverse speed type by way of example and comprises first and second or high-and-reverse and forward drive clutches 40 and 42 which are positioned in series at the rear of the transmission oil pump assembly 36. The high-and-reverse clutch 40 comprises a plurality of clutch discs 40a keyed or splined at their inner peripheral edges to a clutch hub 44 and clutch plate 40b keyed or splined at their outer peripheral edges to a front clutch drum 46 which is in part positioned between the clutches 40 and 42 as shown. Likewise, the forward drive clutch 42 comprises a plurality of clutch discs 42a keyed or splined at their inner peripheral edges to a clutch hub 48 and clutch plates 42b keyed or splined at their outer peripheral edges to a rear clutch drum 50. The clutch hub 44 for the high-and-reverse clutch 40 and the rear clutch drum 50 for the forward drive clutch 42 are integral with each other and are rotatable with the transmission input shaft 28 with the rear clutch drum 50 keyed or splined to a rear end portion of the transmission input shaft 28 which axially projects from the stator support hollow shaft 30 as shown. The clutch discs 40a of the high-and-reverse clutch 40 and the clutch plates 42b of the forward drive clutch 42 thus serve as driving friction elements and, accordingly, the clutch plates 40b of the high-and-reverse clutch 40 and the clutch discs 42a of the forward drive clutch 42 serve as driven friction elements in the clutches 40 and 42, respectively. Though not shown in the drawings, each of the clutches 40 and 42 has incorporated therein a return spring urging the clutch discs and plates of the clutch to be disengaged from one another and a clutch piston which is adapted to bring the clutch discs and plates into engagement with one another when moved by a fluid pressure developed in a fluid chamber which is formed between the piston and the clutch drum 46, as is well known in the art.

The power transmission mechanism shown in FIG. 1 further comprises first and second planatary gear assemblies 52 and 54 which are arranged in series at the rear of the forward drive clutch 42. The first planatary gear assembly 52 comprises an externally toothed sun gear 52a and an internally toothed ring gear 52b which have a common axis of rotation aligned with the center axis of the transmission input shaft 28. The clutch hub 48 for the forward drive clutch 42 has a rear extension or flange 48a to which the ring gear 52b of the second planetary gear assembly 52 is keyed or splined as diagrammatically illustrated in the drawing. The first planatary gear assembly 52 further comprises at least two planet pinions 52c each of which is in mesh with the sun and ring gears 52a and 52b and which is rotatable about an axis around the common axis of rotation of the sun and ring gears 52a and 52b. The planet pinions 52c of the first planatary gear assembly 52 are jointly connected to a pinion carrier 56. The second planatary gear assembly 54 is constructed similarly to the first planatary gear assembly 52 and thus comprises an externally toothed sun gear 54a and an internally toothed ring gear 54b which have a common axis of rotation aligned with the center axis of the transmission input shaft 28. The sun gears 52a and 54a of the first and second planatary gear assemblies 52 and 54, respectively, are jointly splined or otherwise fastened to a connecting shell or drum 58 enclosing the forward drive clutch 42 and the first planatary gear assembly 52 therein and integral with or securely connected to the front clutch drum 46 for the high-and-reverse clutch 40. The second planetary gear assembly 54 further comprises at least two planet pinions 54c each of which is in mesh with the sun and ring gears 54a and 54b and which is rotatable about an axis around the common axis of rotation of the sun and ring gears 54a and 54b. The planet pinions 54c of the second planetary gear assembly 54 are jointly connected to a pinion carrier 60 which is keyed or splined at its outer peripheral edge to a connecting drum 62 enclosing the second planetary gear assembly 54 therein. The connecting drum 62 has a rear axial extension extending rearwardly away from the second planetary gear assembly 54 as shown. The respective sun gears 52a and 54a of the first and second planetary gear assemblies 52 and 54 are formed with axial bores through which a transmission output shaft 64 having a center axis aligned with the center axis of the transmission input shaft 28 is passed through and axially extended rearwardly away from the second planetary gear assembly 54. The transmission output shaft 64 is connected to the pinion carrier 65 of the first planetary gear assembly 52 direction at its foremost end portion and further to the ring gear 53b of the second planetary gear assembly 54 through a generally disc shaped connecting member 66 which is keyed or splined at its inner peripheral edge to an intermediate axial portion of the transmission output shaft 64 and at its outer peripheral edge to the ring gear 54b of the second planetary gear assembly 54. The clutches 40 and 42, the planetary gear assemblies 52 and 54 and the connecting members between the clutches and planetary gear assemblies are enclosed within a transmission case (not shown). The previously mentioned stationary wall structure 34 integral with or securely connected to the stator support hollow shaft 30 may be constituted by a front end portion of the transmission case.

Within a rear end portion of the transmission case is positioned a low-and-reverse brake 68. The low-and-reverse brake 68 is herein assumed to be of the multiple disc type by way of example and is, thus, shown composed of a plurality of brake discs 68a keyed or splined at their inner peripheral edges to the rear axial extension of the connecting drum 62 engaging the pinion carrier 60 of the second planetary gear assembly 52, and a plurality of brake plates 68b which are keyed or splined at their outer peripheral edges to a stationary wall structure 34'. The stationary wall structure 34' may be constituted by a rear end portion of the transmission case. Though not shown in the drawings, the low-and-reverse brake 68 has further incorporated therein a return spring urging the brake discs and plates 68a and 68b of the brake unit to be disengaged from one another and a brake piston which is adapted to bring the brake discs and plates 68a and 68b into engagement with one another when the piston is moved by a fluid pressure developed in a fluid chamber which is formed between the piston and the above mentioned stationary wall structure 34', as is well known in the art. It is apparent that the low-and-reverse brake 68 of the multiple disc type as above described may be replaced with a brake unit of the cone type which is well known in the art.

The low-and-reverse brake 68 is paralleled in effect by a transmission one-way clutch 70 which is positioned within the rear axial extension of the above mentioned connecting drum 68. The transmission one-way clutch 70 is assumed to be of the sprag type by way of example and is, thus, shown comprising a stationary inner race member 70a, a rotatable outer race member 70b and a series of spring loaded sprag segments 70c disposed between the inner and outer race members 70a and 70b. The stationary inner race member 70a is centrally bored to have the transmission output shaft 64 axially passed therethrough and is bolted or otherwise securely fastened to the stationary wall structure 34' which may form part of the transmission case. On the other hand, the rotatable outer race member 70b is keyed or splined along its outer periphery to the rear axial extension of the connecting drum 62 carrying the brake discs 68a of the low-and-reverse brake 68. The sprag segments 70c provided between the inner and outer race members 70a and 70b are arranged in such a manner that the sprag segments 70c are caused to stick to the inner and outer race members 70a and 70b and thereby lock up the rotatable outer race member 70b to the stationary inner race member 70a when the outer race member 70b is urged to turn about the senter axis of the transmission output shaft 64 in a direction opposite to the direction of rotation of the crankshaft 12 of the engine 10, viz., to the direction of rotation of the transmission output shaft 64 to produce a forward drive mode of an automotive vehicle. The direction of rotation of any member rotatable about an axis coincident or parallel with the center axis of the transmission output shaft 64 will be herein referred to as forward direction if the direction of rotation of the member is identical with the direction of rotation of the transmission output shaft 64 to produce a forward drive condition in a vehicle and as reverse direction if the direction of rotation of the member is identical with the direction of rotation of the transmission output shaft 64 to produce a rearward drive condition of the vehicle. Thus, the above described transmission one-way clutch 70 is adapted to allow the connecting drum 62 and accordingly the pinion carrier 60 of the second planetary gear assembly 54 to turn in the forward direction about the center axis of the transmission output shaft 64 but prohibit the connecting drum 60 and the pinion carrier 60 from being rotated in the reverse direction about the center axis of the transmission output shaft 64. The forward direction herein referred to is identical with the direction of rotation of the crankshaft 12 of the engine 10 and accordingly with the direction of rotation of the transmission input shaft 28. It is apparent that the transmission one-way clutch 70 of the sprag type as above described may be replaced with a one-way clutch of the well known cam and roller type if desired.

The power transmission mechanism shown in FIG. 1 further comprises a brake band 72 wrapped around the outer peripheral surface of an axial portion of the connecting shell 58 integral with or securely fastened to the clutch drum 46 for the high-and-reverse clutch 40. The brake band 72 is anchored at one end to the transmission casing and is at the other end connected to or engaged by a fluid operated band servo unit 74 which is illustrated at the top of FIG. 2. Referring to FIG. 2, the band servo unit 74 has a housing formed with brake-apply and brake-release fluid chambers 76 and 76' which are separated by a servo piston 78 connected by a piston rod 80 to the brake band 72. The servo piston 78 is axially moved in a direction to cause the brake band 72 to be contracted and tightened upon the outer peripheral surface of the connecting shell 58 when there is a fluid pressure developed in the brake-apply fluid chamber 76 in the absence of a fluid pressure in the brake-release fluid chamber 76'. The servo piston 78 is biased to axially move in a direction to contract the brake-apply fluid chamber, via., cause the brake band 72 to be disengaged from the connecting shell 58 by means of a return spring 82 incorporated into the servo unit 74. Furthermore, the piston 78 and the housing of the servo unit 74 are designed so that the piston 78 has a differential pressure acting area effective to move the piston in the particular direction when the piston is subjected to fluid pressures on both sides thereof. When a fluid pressure is built up in the brake-release fluid chamber 76', the servo piston 78 is axially moved in a direction to cause the brake band 72 to expand and disengage from the connecting shell 58 regardless of the presence or absence of a fluid pressure in the brake-apply fluid chamber 76 of the servo unit 74.

Turning back to FIG. 1, the output shaft 64 of the power transmission mechanism thus constructed and arranged projects rearwardly from the transmission case and has mounted thereon a transmission governor assembly 84 consisting of primary and secondary gevernor valves 86 and 86' which are arranged in diametrically opposed relationship to each other across the center axis of the transmission output shaft 64. Indicated at 88 is a transmission output shaft locking gear which forms part of a parking lock assembly to lock the transmission output shaft 64 during parking of the vehicle and which is mounted together with a transmission oil distributor (not shown) on the transmission output shaft 64. Though not shown in the drawings, the transmission output shaft 64 is connected at the rear end thereof to the final drive mechanism of the vehicle and thus makes up the power train between the internal combustion engine 10 and the driving road wheels of the vehicle, as well known in the art.

Power Transmission Mechanism—Operation

The high-and-reverse and forward drive clutches 40 and 42, the low-and-reverse brake 68, one-way clutch 70 and brake band 72 of the power transmission mechanism having the construction hereinbefore described are operated in accordance with schedules indicated in Table I.

In Table I, the sign "o" indicates that for each of the high-and-reverse, forward-drive and one-way clutches the clutch in question is in a coupled condition and for the low-and-reverse brake 68 the brake is in a condition applied. As to the brake band 72, the sign "o" in the column under "Applied" indicates that the brake band 72 is actuated to lock up the connecting shell 58 and the sign "o" in the column under "Released" indicates tht the brake band 72 is released from the disconnecting shell 58.

TABLE 1

| Gear Positions | Clutches High/Rev. 40 | For-ward 42 | Low/Rev Brake 68 | One-way Clutch 70 | Brake Band 72 Applied | Released |
|---|---|---|---|---|---|---|
| "P" | | | o | | | |
| "R" | o | | o | | | o |
| "N" | | | | | | |
| "D" D1 | | o | | o | | |
| D2 | | o | | | o | |
| D3 | o | o | | | (o) | o |
| "2" | | o | | | o | |
| "1" | | o | o | | | |

The sign "o" enclosed in the parentheses means that there is a fluid pressure developed in the brake-apply chamber 76 of the servo unit 74 (FIG. 2) but the brake band 72 is released from the connecting drum 58 with a fluid pressure also developed in the brake-release chamber 76' of the servo unit 74.

The parking, reverse drive and neutral gear positions and the automatic forward drive and manual first and second forward drive ranges as indicated in the leftmost column of Table I are selectively established in the transmission mechanism by manipulating a manually operated transmission gear shift lever (not shown) which have positions "P", "R", "N", "D", "2" and "1" respectively corresponding to the above mentioned gear positions and ranges.

When, now, the transmission gear shift lever is in the parking gear position "P" or the neutral gear position "N", both of the high-and-reverse and forward drive clutches 40 and 42 in the transmission mechanism are held in the uncoupled conditions thereof so that the driving connection between the transmission input and output shafts 28 and 64 is interrupted and as a consequence the transmission output shaft 64 is maintained at rest even though the engine 10 may be in operation delivering its power output from the crankshaft 12. Under these conditions, either the parking gear position or the neutral gear position is established in the transmission mechanism depending upon whether the transmission gear shift lever is in the parking gear position "P" or in the neutral gear position "N". If the transmission gear shift lever is in the parking gear position "P", the low-and-reverse brake 68 is held in the condition applied so that the connecting drum 62 and accordingly the pinion carrier 60 of the second planetary gear assembly 54 are locked to the transmission case. During parking of the vehicle, the transmission output shaft locking gear 88 mounted on the governor 84 is engaged by a locking pawl of the above mentioned parking lock assembly so that the transmission output shaft 64 is locked up to the transmission case.

When the transmission gear shift lever is maunally moved into the automatic forward drive range position "D" with the engine 10 operating, the forward drive clutch 42 is caused to couple. The power output delivered from the crankshaft 12 of the engine 10 to the transmission input shaft 28 through the torque converter 14 is transmitted through the forward drive clutch 42 and the clutch hub 48 to the internally toothed ring gear 52b of the first planetary gear assembly 52. The ring gear 52b of the first planetary gear assembly 52 is driven to rotate in the forward direction about the center axis of the transmission output shaft 64 and thereby causes the externally toothed sun gear 52a of the planetary gear assembly 52 to rotate in the opposite direction about the center axis of the shaft 64 through the planet pinions 52c each of which is rotated in the same direction as the ring gear 52b about its own axis of rotation. The externally toothed sun gear 54a of the second planetary gear assembly 54 is rotated with the sun gear 52a of the first planetary gear assembly 52 in the reverse direction about the center axis of the transmission output shaft 64 and causes the internally toothed ring gear 54b of the second planetary gear assembly 54 to turn in the forward direction about the center axis of the transmission output shaft 64. Under these conditions, the individual planet pinions 54c of the second planetary gear assembly 54 are caused to rotate in the forward direction about the respective axes of rotation thereof and therefore attempt to turn in the reverse direction about the center axis of the transmission output shaft 64. The revolution of the pinion carrier 60 of the second planetary gear assemby 54 is, however, prohibited by the one-way clutch 70 connected to the pinion carrier 60 by the connecting drum 62 with the result that the pinion carrier 60 is locked to the transmission case and act as reaction elements for the ring gear 54b which drives the transmission output shaft 64 to rotate in the forward direction about the center axis thereof. The transmission output shaft 64 is connected to the pinion carrier 56 of the first planetary gear assembly 52 so that the planet pinions 52c of the first planetary gear assembly 52 is rotated about the center axis of the transmission output shaft 64 in the same direction as the direction of rotation of the ring gear 52b of the planetary gear assembly 52 but at a revolution speed which is lower with a certain ratio than the revolution speed of the ring gear 52b on which the planet pinions 52c are rolling, thereby creating the first or "low" gear ratio ($D_1$) in the automatic forward drive range in the transmission mechanism.

If the vehicle is thereafter sped up and the vehicle speed reaches a certain level, the band servo unit 74 for the brake band 72 is actuated by a fluid pressure developed in the brake-apply fluid chamber 76 of the servo unit 72 (FIG. 2A) and causes the brake band 72 to be tightened around the connecting shell 58 which is keyed or splined to the respective sun gears 52a and 54a of the first and second planetary gear assemblies 52 and 54. The sun gear 52a of the first planetary gear assembly 52 now acts as a reaction element for the planet pinions 52c which are being driven to turn in the forward direction about the center axis of the transmission output shaft 64 by the ring gear 52b rotating with the transmission input shaft 28 through the forward drive clutch 42 which is kept coupled. The driving torque carried over to the ring gear 52b of the first planetary gear assembly 52 through the forward drive clutch 42 is therefore transmitted to the transmission output shaft 64 by means of the planet pinions 52c of the first planetary gear assembly 52 and the associated pinion carrier 56. Under these conditions, the individual planet pinions 52c of the first planetary gear assembly 52 are caused to rotate in the forward direction about the respective axes of rotation thereof and thus roll on the internally toothed ring gear 52b of the planetary gear assembly 52 while rotating in the forward direction about the center axis of the transmission output shaft 64. The transmission output shaft 64 is thus rotated in the forward direction about the center axis thereof at a speed higher than that achieved under the first forward drive gear condition but lower with a certain ratio than the revolution speed of the ring gear 52b of the first planetary gear assembly 52, thereby producing the second or "intermediate" gear ratio "$D_2$" in the automatic forward in the transmission mechanism. Under the second gear ratio condition thus established, the transmission output shaft 64 drives the ring gear 54b of the second planetary gear assembly 54 to rotate in the forward direction about the center axis of the shaft 64 and thereby causes the planet pinions 54c of the planetary gear assembly 54 to turn about the center axis of the transmission output shaft 64 in the same direction as the direction of rotation of the ring gear 54b. Thus, the pinion carrier 60 of the second planetary gear assembly 54 and accordingly the connecting drum 62 are also rotated in the forward direction about the center axis of the transmission output shaft 64 and cause the outer race member 70b of the transmission one-way clutch 70 to run idle around the inner race member 70a of the clutch 70.

As the vehicle speed further increases, a fluid pressure is developed in the brake-release fluid chamber 76' of the band servo unit 72 (FIG. 2) and causes the brake band 72 to be released from the connecting shell 58 and, substantially at the same time, the high-and-reverse clutch 40 is actuated to couple. The power output delivered from the crankshaft 12 of the engine 10 to the transmission input shaft 28 is now transmitted on the one hand to the respective sun gears 52a and 54a of the first and second planetary gear assemblies 52 and 54 through the high-and-reverse clutch 40 and the connecting shell 58 released from the brake band 72 and on the other hand to the ring gear 52b of the first planetary gear assembly 52 by way of the forward drive clutch 42 and the clutch hub 48. It therefore follows that the sun gear 52a and the ring gear 52b of the first planetary gear assembly 52 are interlocked together so that the sun and ring gears 52a and 52b and the planet pinions 52c of the first planetary gear assembly 52 as well as the transmission output shaft 64 connected to the planet pinions 52c by the pinion carrier 56 are driven to rotate as a single unit in the forward direction about the center axis of the transmission output shaft 64. The transmission output shaft 64 is thus rotated in the forward direction about the center axis thereof at a speed substantially equal to the revolution speed of the transmission input shaft 28, thereby providing the third or "high" gear ratio ($D_3$) in the automatic forward drive range in the transmission mechanism. Under the third forward drive gear ratio condition thus established, the transmission input shaft 28 driven by the trubine runner 18 of the torque converter 14 is rotated at a speed substantially equal to the revolution speed of the engine crankshaft 12 driving the pump impeller 16 of the torque converter 14 and, as a consequence, there occurs no torque multiplication by the torque converter 14, which thus functions merely as a fluid coupling.

When the manually operated transmission gear shift lever is moved into the reverse position "R", the high-and-reverse clutch 40 and the low-and-reverse brake 68 are actuated in the transmission mechanism illustrated in FIG. 1. With the high-and-reverse clutch 40 thus coupled, the power output delivered from the crankshaft 12 of the engine 10 to the transmission input shaft 28 by way of the torque converter 14 is transmitted through the clutch 40, front clutch drum 46 and connecting shell 58 to the sun gears 52a and 54a of the first and second planetary gear assemblies 52 and 54, respectively, causing the sun gears 52a and 54a to rotate in the forward direction about the center axis of the transmission output shaft 64. The low-and-reverse brake 68 being actuated to lock the connecting drum 62 to the transmission case, the pinion carrier 60 of the second planetary gear assembly 54 is held stationary with respect to the transmission case, with the result that the planet pinions 54c of the second planetary gear assembly 54 are driven by the sun gear 54a of the second planetary gear assembly 54 for rotation in the reverse direction about their respective axes of rotation. This causes the ring gear 54b of the second planetary gear assembly 54 and accordingly the transmission autput shaft 64 to rotate in the reverse direction about the center axis thereof at a speed which is lower with a certain ratio than the revolution speed of the sun gears 52a and 54a of the planetary gear assemblies 52 and 54 and accordingly of the transmission input shaft 28, establishing the reverse drive gear condition in the transmission mechanism.

When the transmission gear shift lever is in the manual second forward drive range position "2", the forward drive clutch 42 and the brake band 72 are actuated in combination and, as a consequence, the transmission output shaft 64 is driven to rotate in the forward direction about the center axis thereof by means of the pinion carrier 56 of the first planetary gear assembly 52 so as to produce the second or "intermediate" gear ratio between the transmission input and output shafts 28 and 64 as in the second gear ratio condition produced with the transmission gear shift lever held in the automatic forward drive range position "D".

Under the condition in which the transmission gear shift lever is moved into the manual first forward drive range position "1", the low-and-reverse brake 68 as well as the forward drive clutch 42 is actuated to lock the pinion carrier 60 of the second planetary gear assembly 54. The transmission output shaft 64 is driven to rotate in the forward direction about the center axis thereof by the ring gear 54b of the second planetary gear assembly 54 having the pinion carrier 60 held stationary with respect to the transmission case so as to produce the first or "low" gear ratio between the transmission input and output shaft 28 and 64, as in the first gear ratio condition produced with the transmission gear shift lever held in the automatic forward drive range position "D". While the pinion carrier 60 of the second planetary gear assembly 54 is locked to the transmission case by the action of the transmission one-way clutch 70 under the first gear ratio condition produced in the automatic forward drive range, the pinion carrier 60 is locked to the transmission case by means of the low-and-reverse brake 68 under the manual first forward drive range condition. During the manual first forward drive range condition, therefore, a driving torque can be transmitted backwardly from the ring gear 54b to the sun gear 54a through the planet pinions 54c in the second planetary gear assembly 54 and, for this reason, the engine can be braked upon by the inertia of the vehicle.

In accordance with the present invention, the clutches and brakes incorporated in the transmission mechanism thus constructed and arranged are actuated selectively by means of a hydraulic control system illustrated in FIG. 1. It should however be borne in mind that the transmission mechanism hereinbefore described with reference to FIG. 1 is merely illustrative of a representative example of a transmission mechanism to which the hydraulic control system according to the present invention is applicable and that the hydraulic control system illustrated in FIGS. 2A and 2B is compatible with any power transmission mechanism including clutches and brakes which are to be actuated in accordance with the schedules indicated in Table 1.

Hydraulic Control System—Arrangement

Figure 2A:
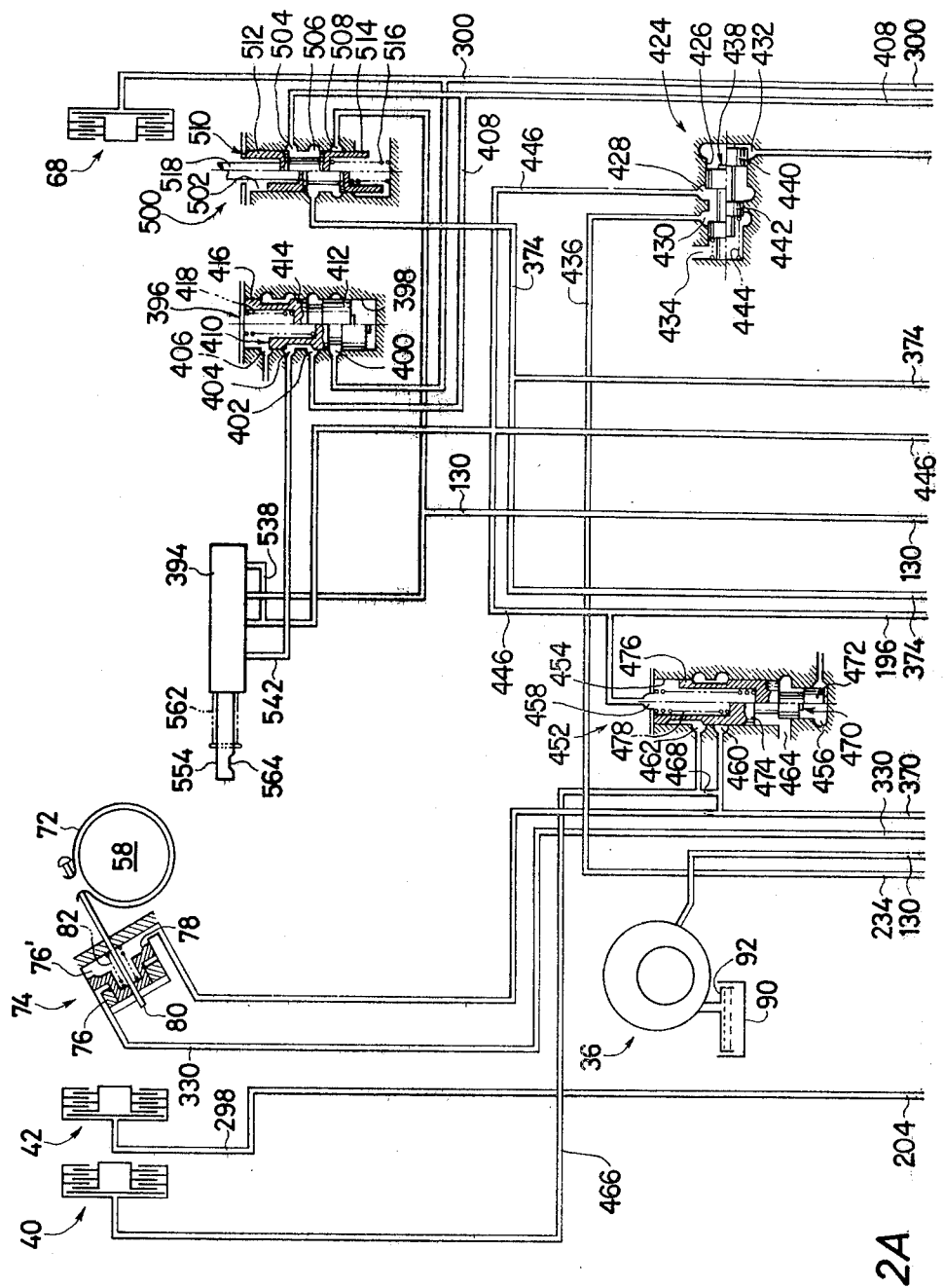
FIGS. 2A and 2B are a schematic view showing the general valve arrangement of a hydraulic control system incorporating a preferred embodiment of a transmission throttle valve proposed by the present invention.
Figure 2B:
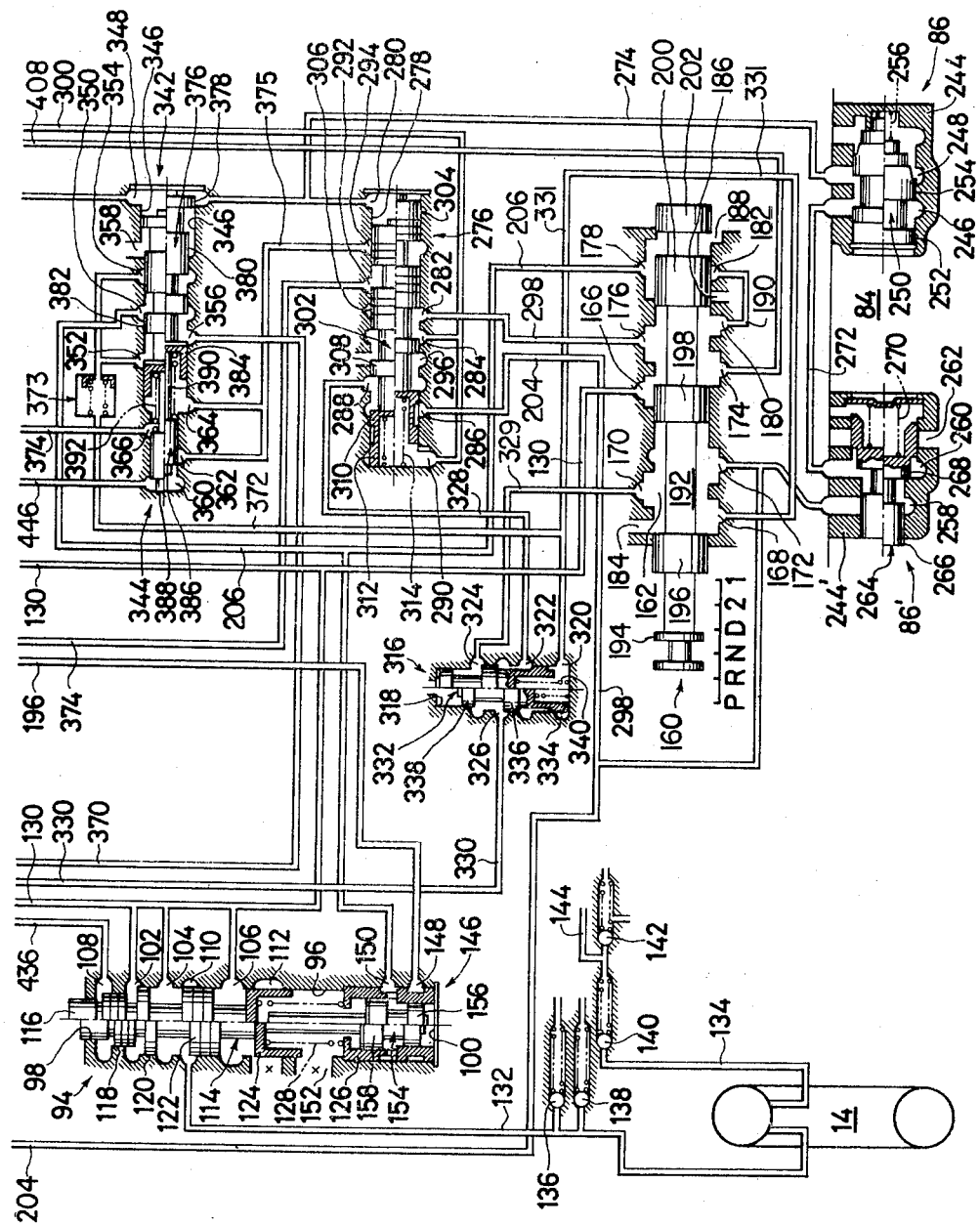

Referring to FIGS. 2A and 2B, the hydraulic control system for use with the power transmission mechanism illustrated in FIG. 1 is supplied with fluid under pressure from the transmission oil pump assembly 36 which has a suction port communicating with a transmission oil reservoir 90 having an oil strainer 92 installed therein. Though not shown in the drawings, the oil reservoir 90 is provided below a transmission control valve body bolted or otherwise securely attached to the bottom of the transmission case as is well known in the art. The oil strainer 92 is adapted to remove dust from the fluid to be sucked in by the transmission oil pump assembly 36 from the oil reservoir 90 during operation of the vehicle.

The transmission oil assembly 36 is driven by the pump impeller 16 (FIG. 1) of the torque converter 14 as previously noted and delivers at its fluid discharge port a fluid pressure which is variable with the revolution speed of the engine crankshaft driving the pump impeller of the torque converter 14. The fluid pressure delivered from the transmission oil pump assembly 36 is thus subject to fluctuations responsive to various operating conditions of the engine. In order to supress such fluctuations in the fluid pressure delivered from the transmission oil pump assembly 36, the hydraulic control system shown in FIG. 2 comprises a pressure regulator valve 94 which is operative to develop a line pressure Pl which remains substantially constant at low engine speeds and increases as the engine speed is increased within a certain range. When the vehicle speed increases beyond a certain level, the line pressure Pl decreases as the engine speed increases, as will be discused in more detail as the description proceeds.

The pressure regulator valve 94 comprises an elongated valve chamber 96 which is formed in the above mentioned transmission control valve body and which is contiguous at one axial end to a bore 98 also formed in the control valve body. The valve chamber 96 is closed at the other axial end by an end wall 100 formed by the control valve body or constituted by any plate member attached to the control valve body. The valve chamber 96 has first, second and third line pressure ports 102, 104 and 106, a modified throttle pressure port 108, a torque converter fluid supply port 110 and a drain port 112. With the valve chamber 96 thus arranged is mounted a pressure regulator valve spool 114 which is axially slidable in the valve chamber 96 and which has an axial extension 116 slidably received in the above mentioned bore 98 adjacent to the valve chamber 96. The valve spool 114 has first, second, third and fourth circumferential lands 118, 120, 122 and 124 which are arranged in this sequence away from the extension 116 of the valve spool 114. The circumferential lands 118, 120, 122 and 124 are axially spaced apart from each other and thus form a circumferential groove between every adjacent two of them. The lands of the valve spool 114 have substantially equal cross sectional areas except for the first circumferential land 118 which is smaller in cross sectional area than the remaining lands 120, 122 and 124 as shown. The lands of the valve spool 114 are, furthermore, arranged in such a manner that the individual grooves formed between the first, second, third and fourth circumferential lands 118, 120, 122 and 124 are at all times open to the first, second and third line pressure ports 102, 104 and 106, respectively, and the annular outer end face of the first circumferential land 118 having the extension 116 axial projecting therefrom is constantly subjected to a fluid pressure developed in the modified throttle pressure port 108. The valve spool 114 thus configured is movable within the valve chamber 96 between a first axial position closing the torque converter fluid supply port 110 and the drain port 112 by the third and fourth circumferential lands 122 and 124, respectively, thereof as indicated by the right half of the valve spool 114, and a second axial position having the grooves between the third and fourth circumferential lands 122 and 124 open to the torque converter fluid supply port 110 and the drain port 112, respectively, as indicated by the left half of the valve spool 114. When the valve spool 114 is in the second axial position thereof, communication is provided between the second line pressure port 104 and the torque converter fluid supply port 110 through the groove between the second and third circumferential lands 120 and 122 and between the third line pressure port 106 and the drain port 112 through the groove between the third and fourth circumferential lands 122 and 124. Such communication is blocked when the valve spool 114 is in the first axial position thereof.

Within the valve chamber 96 is further provided a sleeve 126 which is fixedly held in place adjacent to the previously mentioned closed end wall 100 of the valve chamber 96 and which has an annular end wall confronting the fourth circumferential land 124 of the valve spool 114. A preloaded helical compression spring 128 is positioned between the sleeve 126 and the valve spool 114 and is seated at one end on the annular end wall of the sleeve 126 and received at the other end in a blind axial bore formed in the fourth land 124. The pressure regulator valve spool 114 is, thus, biased to move toward the first axial position thereof by means of the spring 128. During operation of the pressure regulator valve 94, the force of the spring 128 thus acting on the valve spool 114 opposes the force resulting from a fluid pressure developed in the first line pressure port 102 and thus acting on the differential pressure acting area between the first and second circumferential lands 118 and 120 of the valve spool 114 and, in the presence of a fluid pressure in the modified throttle pressure port 108 in addition to the fluid pressure in the first line pressure port 102, the force produced by the fluid pressure thus acting on the annular outer end face of the first circumferential land 118 as well.

The first, second and third line pressure ports 102, 104 and 106 of the pressure regulator valve 94 are all in constant communication with the fluid discharge port of the transmission oil pump 36 through a line pressure circuit 130, while the drain port 112 is open to the fluid reservoir 90. If the force of the spring 128 of the pressure regulator valve 94 is overcome by the force resulting from the fluid pressure developed in the first line pressure port 102 or by the sum of the forces resulting from the fluid pressures developed in the line and modified throttle pressure ports 102 and 108, the valve spool 114 of the pressure regulator valve 94 is moved toward the second axial position thereof and allows the fluid in the line pressure circuit 130 to be discharged into the oil reservoir 90 by way of the third line pressure port 106 and the drain port 112 through the groove between the third and fourth circumferential lands 122 and 124 of the valve spool 114. An excess of fluid pressure which may be developed in the line pressure circuit 130 is in this fashion relieved through the drain port 112 of the pressure regulator valve 94 until the fluid pressure in the line pressure circuit 130 is reduced to a certain level at which the force produced by the fluid pressure acting on the valve spool 114 from the first line pressure port 102 or the sum of the forces resulting from the fluid pressures acting on the valve spool 114 from the line and modified throttle pressure ports 102 and 108, respectively, is equalized with the opposing force of the spring 128. When such a level is reached by the fluid pressure in the line pressure circuit 130, the valve spool 114 of the pressure regulator valve 94 is moved toward the first axial position thereof and blocks the communication between the ports 106 and 112 by the fourth circumferential land 124 thereof. If, conversely, the force or the sum of the forces thus exerted on the valve spool 114 against the action of the spring 128 is overcome by the force of the spring 128, then the valve spool 114 is moved toward the first axial position thereof with the result that the fluid confined in the line pressure circuit 130 with the drain port 112 closed by the fourth circumferential land 124 of the valve spool 114 is urged to compress. This causes the fluid pressure in the line pressure circuit 130 to rise until the force or the sum of the forces exerted on the valve spool 114 against the action of the spring 128 becomes equal to the force of the spring 128. In the absence of a fluid pressure in the modified throttle pressure port 108, the valve spool 114 of the pressure regulator valve 94 is in these manners repeatedly moved back and forth or caused to "hunt" between the first and second axial positions thereof in an attempt to assume an equilibrium axial portion in which the force produced by the fluid pressure acting on the differential pressure acting area between the lands 118 and 120 of the valve spool 114 is substantially balanced with the opposing force of the spring 128. The fluid pressure in the line pressure circuit 130 constantly communicating with the first line pressure port 102 of the pressure regulator valve 94 is therefore maintained at a substantially constant level or the line pressure Pl dictated by the force of the spring 128, irrespective of the fluctuations which may occur in the fluid pressure developed at the fluid discharge port of the transmission oil pump assembly 36. When there is a fluid pressure developed in the modified throttle pressure port 108, not only the force resulting from the line pressure Pl acting on the differential pressure acting area of the valve spool 114 but a force produced by the fluid pressure acting on the annular outer end face of the first circumferential land 118 of the valve spool 114 oppose the force of the spring 128 with the result that the line pressure Pl acting on the differential area of the valve spool 114 is reduced or "cut down" to a level which is dictated or variable with the fluid pressure built up in the throttle pressure port 108.

The torque converter fluid supply port 110 of the pressure regulator valve 94 thus constructed and arranged is in constant communication with the torque converter 14 through a torque converter fluid supply circuit 132 and, past the torque converter 14, further with a torque converter fluid discharge circuit 134. The torque converter fluid supply circuit 132 is shown provided with a converter inlet pressure relief valve 136 and a front transmission unit lubricating fluid supply valve 138 and, likewise, the torque converter fluid discharge circuit 134 is shown provided with a converter outlet pressure relief valve 140 and a rear transmission unit lubricating fluid drain-back valve 142. The converter inlet pressure relief valve 136 is adapted to be open and discharge the fluid from the torque converter fluid supply circuit 132 when the pressure of the fluid in the converter fluid supply circuit 132 is higher than a predetermined value. The front transmission unit lubricating fluid supply valve 138 is arranged in parallel, in effect, with the converter inlet pressure relief valve 136 and is operative to pass the converter fluid to the front unit of the transmission mechanism at a limited rate for lubricating the various slidable members and structures forming part of or incorporated into the front transmission unit. On the other hand, the converter outlet pressure relief valve 140 is disposed between the torque converter fluid discharge circuit 134 and a rear transmission unit lubricating fluid circuit 144 and is operative to pass the fluid from the converter fluid discharge circuit 134 to the rear unit of the transmission mechanism through the lubricating fluid circuit 144 when the fluid pressure in the torque converter fluid discharge circuit 134 is higher than a predetermined value. The rear transmission unit lubricating fluid drain-back valve 142 is arranged in parallel, in effect, with the above mentioned rear transmission unit lubricating fluid circuit 144 and is adapted to be open and discharge the fluid from the lubricating fluid circuit 144 when the pressure of the fluid to be passed to the rear transmission unit by way of the fluid circuit 144 is higher than a predetermined value.

Reverting to the presure regulator valve 94, the sleeve 126 providing a spring seat for the spring 128 of the regulator valve 94 forms part of a line pressure booster valve 146 which is adapted to reduce the line pressure Pl under predetermined operational conditions of the vehicle as will be described in more detail. Thus, the valve chamber 96 having the sleeve 126 accommodated therein further has a throttle pressure port 148, a line pressure port 150 and a drain port 152, which are located at greater spacings from the closed end wall 100 of the valve chamber 96. The sleeve 126 is formed with a cutout located adjacent to the end wall 100 of the valve chamber 96 and open to the throttle pressure port 148 and an opening located in an intermediate axial portion of the sleeve 126 and open to the line pressure port 150 as shown. The drain port 152 is located intermediate between the annular end wall of the sleeve 126 and the drain port 112 of the pressure regulator valve 94 and is open to the transmission oil reservoir 90. The sleeve 126 further has a stepped axial bore having one end at the closed axial end wall 100 of the valve chamber 96 and open at the other end to the drain port 152 through an aperture in the annular end wall of the sleeve 126. A valve spool 154 is in part positioned and axially movable within this stepped axial bore in the sleeve 126 and is formed with first and second circumferential lands 156 and 158 which are axially slidable on the stepped inner peripheral surfaces, respectively, of the sleeve 126 between the closed end wall 100 of the valve chamber 96 and the annular end wall of the sleeve 126. The lands 156 and 158 of the valve spool 154 are axially spaced apart from each other and thus form a circumferential groove therebetween. The second circumferential land 158 is larger in cross sectional area than the first circumferential land 156 so that a differential pressure acting area is provided between the opposite annular end faces of the lands 156 and 158. The valve spool 154 further has an axial extension projecting outwardly from the second circumferential land 158 toward the internal end face of the fourth land 124 of the valve spool 114 of the pressure regulator valve 94 through the aperture in the annular end wall of the sleeve 126, as shown.

When there is a fluid pressure developed in the throttle pressure port 148 of the line pressure booster valve 146 thus constructed and arranged, the fluid pressure acts on the end face of the first land 156 of the line pressure booster valve spool 154 through the above mentioned cutout in the sleeve 126 and forces the valve spool 154 to axially move away from the closed end wall 100 of the valve chamber 96 and brings the axial extension 160 of the valve spool 154 into abutting and thereafter pressing engagement at its leading end with the internal end face of the fourth land 124 of the pressure regulator valve spool 114 as indicated by the left half of the valve spool 154 of the line pressure booster valve 146. Under these conditions, the force of the spring 128 acting on the valve spool 114 of the pressure regulator valve 94 is reinforced by the force thus applied to the valve spool 114 from the valve spool 154 of the pressure booster valve 146 so that the line pressure Pl acting on the differential pressure acting area of the valve spool 114 of the pressure regulator valve 94 through the first line pressure port 102 of the valve 94 is augmented or "boosted" by a value which is proportional to the fluid pressure acting on the end face of the first circumferential land 156 of the valve spool 154 of the line pressure booster valve 146 irrespective of the presence or absence of a fluid pressure in the throttle pressure port 108 of the pressure regulator valve 94. Under predetermined conditions of the vehicle (as when the transmission gear shift lever is in the reverse drive position "R" as will be discussed), a fluid pressure is developed in the line pressure port 150 in addition to the fluid pressure developed in the throttle pressure port 148 of the booster valve 146 and acts on the differential pressure acting area between the first and second circumferential lands 156 and 158 of the line pressure booster valve 146. Under these conditions, the line pressure Pl acting on the differential area of the valve spool 114 of the pressure regulator valve 94 is opposed not only by the force of the spring 128 and the force resulting from the fluid pressure acting on the outer end face of the first circumferential land 156 of the valve spool 154 of the line pressure booster valve 146 but by the fluid pressure acting on the differential area of the booster valve spool 154 and is, therefore, further increased or "boosted".

The line pressure Pl developed by the pressure regulator valve 94 is distributed selectively to the various control valves hereinbefore described and to the fluid chambers of the transmission clutches and brakes through a manually operated transmission gear position selector valve 160. The gear position selector valve 160 comprises an elongated valve chamber 162 which is formed in a wall portion of the transmission control valve body and which is open at both axial ends thereof. The wall portion of the transmission control valve body is further formed with a line pressure inlet port 166; first, second, third, fourth, fifth and sixth line pressure outlet ports 168, 170, 172, 174, 176 and 178; first and second bypass ports 180 and 182; and first, second and third drain ports 184, 186 and 188. The pressure inlet port 166 is in constant communication with the line pressure circuit 130, and the drain ports 184, 186 and 188 are open to the transmission oil reservoir 90. The first and second bypass ports 180 and 182 are in constant communication with each other through a bypass passageway 190. The first and third drain ports 184 and 188 are located adjacent to the opposite axial ends, respectively, of the valve chamber 162 and the first to sixth line pressure outlet ports 168, 170, 172, 174, 176 and 178 are arranged in this sequence away from the first drain port 184 toward the third drain port 188 as shown. The first and second bypass ports 180 and 182 are located between the fifth line pressure outlet port 176 and the third drain port 188 with the second drain port 186 located between the bypass ports 180 and 182. The sixth line pressure outlet port 178 is located substantially aligned with the second bypass port 182 which is located between the second and third drain ports 186 and 188. The line pressure inlet port 166 is located between the fifth line pressure outlet port 176 and the first bypass port 180.

A valve spool 192 has a yoke 194 engaged by the transmission gear shift lever through a suitable mechanical linkage (not shown) and is formed with first, second, third and fourth circumferential lands 196, 198, 200 and 202 which are shown to be arranged in this sequence rightwardly of the yoke 194 shown formed at the left axial end of the valve spool 192. The yoke 194 and the circumferential lands 196, 198, 200 and 202 are axially spaced apart from each other and thus form a circumferential groove between every adjacent two of them. The valve spool 192 thus configured is axially movable through the valve chamber 162 between a parking gear position "P", a reverse drive gear position "R", a neutral gear position "N", an automatic forward drive range position "D", a manual second forward drive range position "2" and a manual first forward drive range position "1" which correspond to their respective counterpart positions of the transmission gear shift lever. When the valve spool 192 of the transmission gear selector valve 160 thus constructed and arranged is in the parking gear position "P", the first, second and third line pressure outlet ports 168, 170 and 172 are open to the first drain port 184 through the groove between the yoke 194 and the first circumferential land 196 of the valve spool 192; the fourth and fifth line pressure outlet ports 174 and 176 are in communication with the line pressure inlet port 166 through the groove between the second and third circumferential lands 198 and 200 of the valve spool 446; the first bypass port 180 is closed by the third circumferential land 200 of the valve spool 192; and the sixth line pressure outlet port 178 is open to the second drain port 186 through the groove between the third and fourth circumferential lands 200 and 202 and to the third drain port 188 past the fourth circumferential land 202 of the valve spool 192. When the valve spool 192 is in the reverse drive gear position "R", the first, second and third line pressure outlet ports 168, 170 and 172 are open to the first drain port 184 through the groove between the yoke 194 and the first circumferential land 196 of the valve spool 192; the fourth and fifth line pressure outlet ports 174 and 176 and the first bypass port 180 are in communication with the line pressure inlet port 166 through the groove between the second and third circumferential lands 198 and 200; the second and third drain ports 186 and 188 are closed by the third and fourth circumferential lands 200 and 202, respectively, of the valve spool 192; and the sixth line pressure outlet port 178 and the second bypass port 182 are open to each other through the groove between the third and fourth circumferential lands 200 and 202 of the valve spool 192 so that the sixth line pressure outlet port 178 is in communication with the line pressure inlet port 166 through the bypass passageway 190 joining the first and second bypass ports 180 and 182. When the valve spool 192 is in the neutral gear position "N", the first, second and third line pressure outlet ports 168, 170 and 172 are open to the first drain port 184; the fourth and fifth line pressure outlet ports 174 and 176 and the first bypass port 180 are in communication with the line pressure inlet port 166 through the groove between the second and third circumferential lands 198 and 200 of the valve spool 192; the second bypass port 182 and the second drain port 186 are closed by the third circumferential land 200 of the valve spool 192; and the sixth line pressure outlet port 178 is open to the third drain 188 through the groove between the third and fourth circumferential lands 200 and 202 of the valve spool 192 as shown in FIG. 2B. When the valve spool 192 is in the automatic forward drive range position "D", the first drain port 184 is closed by the first circumferential land 196 of the valve spool 192; the first, second and third line pressure outlet ports 168, 170 and 172 are in communication with the line pressure inlet port 166 through the groove between the first and second circumferential lands 196 and 198 of the valve spool 192; the fourth, fifth and sixth line pressure outlet ports 174, 176 and 178 and the first bypass port 180 are open to the second drain port 186; and the second bypass port 182 and the third drain port 188 are closed by the fourth circumferential land 202 of the valve spool 192. When the valve spool 192 is in manual second forward drive range position "2", the first drain port 184 and the first line pressure outlet port 168 are in communication with each other through the groove between the yoke 194 and the first circumferential land 196 of the valve spool 192 but isolated from the line pressure inlet port 166 by the first circumferential land 196 of the valve spool 192; the second, third and fourth line pressure outlet ports 170, 172 and 174 are in communication with the line pressure inlet port 166 through the groove between the first and second circumferential lands 196 and 198 of the valve spool 192; the fifth and sixth line pressure ports 176 and 178 and the first and second bypass ports 180 and 182 are open to the second drain port 186 through the groove between the second and third circumferential lands 198 and 200 of the valve spool 192; and the third drain port 188 is closed by the third circumferential land 200 of the valve spool 192. When the valve spool 192 is in the manual first forward drive range position "1", the first and second line pressure outlet ports 168 and 170 are open to the first drain port 184 through the groove between the yoke 194 and the first circumferential land 196 of the valve spool 192 but are isolated from the line pressure inlet port 166 by the first circumferential land 196 of the valve spool 192; the third, fourth and fifth line pressure outlet ports 172, 174 and 176 are in communication with the line pressure inlet port 166 through the groove between the first and second circumferential lands 196 and 198 of the valve spool 192; the first bypass port 180 is closed by the second circumferential land 198 of the valve spool 192; and the sixth line pressure outlet port 178 and the second bypass port 182 are open to the second and third drain ports 186 and 188 through the groove between the second and third circumferential lands 198 and 200 of the valve spool 192.

Thus, the first line pressure outlet port 168 is open to the line pressure inlet port 166 only when the valve spool 192 is in the automatic forward drive range position "D". The second line pressure outlet port 170 is open to the line pressure inlet port 166 of the gear position selector valve 160 when the valve spool 192 of the selector valve 160 is either in the automatic forward drive range position "D" or in the manual second forward drive range position "2". The third line pressure outlet port 172 is open to the line pressure inlet port 166 when the valve spool 192 is in any one of the automatic and manual forward drive range positions "D", "2" and "1", and is in communication with a forward drive clutch actuating fluid circuit 204. The fourth line pressure outlet port 174 is open to the line pressure inlet port 166 when the valve spool 192 is in any one of the positions except for the automatic forward drive range "D". The fifth line pressure outlet port 176 is open to the line pressure inlet port 166 when the valve spool 192 is in any one of the parking gear position "P", reverse drive gear position "R", neutral gear position "N" and manual first forward drive range "1". The sixth line pressure outlet port 178 is open to the line pressure inlet port 166 only when the valve spool 192 is in the reverse drive gear position "R", and is in communication with the line pressure port 150 of the line pressure booster valve 146 through a fluid circuit 206.

In the hydraulic control system embodying the present invention, there is used another control pressure, herein referred to as governor pressure Pg which is produced by the transmission governor assembly. As priviously noted, the transmission governor assembly 84 is mounted on the output shaft 64 (FIG. 1) of the power transmission mechanism and consists of the primary and secondary governor valves 86 and 86'. As is well known in the art, the primary governor valve 86 is a sort of "on-off" type valve and is adapted to be open when the revolution speed of the transmission output shaft is higher than a predetermined value, while the secondary governor valve 86' is a sort of proportioning valve which delivers an output pressure continuously variable with the revolution speed of the transmission output shaft throughout the range of the revolution speed available of the transmission output shaft when the shaft is being driven to rotate in the previously mentioned forward direction thereof. The primary and secondary governor valves of these natures are well known in the art and may be readily modified by those skilled in the art, only important features of the constructions herein shown will be hereinafter described.

The primary and secondary governor valves 86 and 86' are built into a common valve body which is shown to be split into two valve body portions 244 and 244' having the primary and secondary governor valves 86 and 86', respectively, accommodated therein. The valve body portions 244 and 244' are usually mounted on the transmission output shaft in diametrically opposed relationship to each other across the center axis of the shaft, though not shown in the drawings. The valve body portions 244 for the primary governor valve 86 is formed with a valve chamber having fluid inlet and outlet ports 246 and 248. Within the valve chamber is provided a valve spool 250 axially slidable in the valve chamber and having first and second circumferential lands 252 and 254 which are axially spaced apart from each other and which form therebetween a circumferential groove which is constantly open to the fluid inlet port 246. The valve spool 250 is urged to move toward the transmission output shaft by a preloaded compression spring 256. When the transmission output shaft is held at rest, the valve spool 250 is maintained in an axial position closest to the transmission output shaft by the force of the spring 256 so that the fluid outlet port 248 is closed by the second circumferential land 254 of the valve spool 250, as indicated by the lower half of the valve spool 250. On the other hand, the valve body portion 244' for the secondary governor valve 86' is formed with a valve chamber having not only fluid inlet and outlet ports 258 and 260 but a drain port 262. Within the valve chamber is provided a weighted valve spool 264 axially slidable in the valve chamber and having a first circumferential land 266 and a second circumferential land 268. The lands 266 and 268 are axially spaced from each other and have formed therebetween a circumferential groove which is open to the fluid inlet port 258 or the fluid outlet port 260 depending upon the axial position of the valve spool 264 within the valve chamber. The valve spool 264 is urged to move away from the transmission output shaft by a preloaded compression spring 270. The second circumferential land 268 is larger in cross sectional area than the first circumferential land 266 so that a differential pressure acting area is formed between the lands 266 and 268. The fluid outlet port 260 of the secondary governor valve 86' is in constant communication with the fluid inlet port 246 of the primary governor valve 86 through a passageway 272 formed in the governor valve body constructed by the valve body portions 244 and 244'. In the fluid inlet port 258 of the secondary governor valve 86' is developed the line pressure Pl when the transmission gear shift lever is in the automatic or manual forward drive range position "D", "2" or "1" as will be described later. When the transmission output shaft is held at rest with the engine also held at rest, there is no fluid pressure developed in the fluid inlet port 258 of the secondary governor valve 86' so that the valve spool 264 of the secondary governor valve 86' is held in an axial position remotest from the transmission output shaft by the force of the spring 270 as indicated by the lower half of the valve 86'. When valve spool 264 is held in this axial position, the fluid inlet port 258 is open to the circumferential groove between the lands 266 and 268 and the fluid outlet port 260 and the drain port 262 are closed by the second circumferential land 268 of the spool 264.

When the engine is started under these conditions and thereafter the transmission gear shift lever is moved to any of the above mentioned positions, the line pressure Pl developed by the pressure regulator valve 94 is introduced by way of the forward drive clutch actuating fluid circuit 204 into the fluid inlet port 258 of the secondary governor valve 86' and acts on the differential pressure acting area between the lands 266 and 268 of the valve spool 264. The valve spool 264 of the secondary governor valve 86' is therefore urged to move toward the transmission output shaft against the force of the spring 270 with the result that the valve spool 264 is maintained in an axial position in which the groove between the lands 266 and 268 is located to be open to the fluid outlet port 260 as indicated by the upper half of the governor valve 86', with the force of the spring 270 equally balanced by the force produced by the fluid pressure acting on the differential pressure acting area of the valve spool 264. When the transmission output shaft is being driven for rotation about the center axis thereof, the force thus urging the valve spool 264 to move toward the transmission output shaft is opposed not only by the force of the spring 270 but a centrifugal force created in the weighted valve spool 264 accommodated in the valve body portion 244' revolving with the shaft. The valve spool 264 is therefore moved within the valve chamber in an attempt to assume an equilibrium axial position in which the fluid pressure acting on the differential pressure acting area of the spool 264 is equalized with the sum of the force of the spring 270 and the centrifugal force exerted on the valve spool 264. A fluid pressure varying with the centrifugal force produced in the valve spool 264 and accordingly with the angular velocity of the transmission output shaft about the center axis thereof is in this fashion developed in the fluid outlet port 260 of the secondary governor valve 86'. The fluid pressure thus developed by the secondary governor valve 86' is referred to as governor pressure and is herein denoted by Pg. The governor pressure Pg is continuously variable with the revolution speed of the transmission output shaft and accordingly with the road speed of the vehicle. When the transmission output shaft is being rotated about the center axis thereof, a centrifugal force is also produced in the weighted valve spool 250 of the primary governor valve 86 and urges the valve spool 250 to move radially away from the transmission output shaft against the force of the spring 256. Until the revolution speed of the transmission output shaft reaches a predetermined value, however, the centrifugal force thus exerted on the primary governor valve spool 250 is overcome by the force of the spring 256 so that the valve spool 250 is maintained in situ within the valve body portion 244 revolving with the transmission output shaft. Under these conditions, the governor pressure Pg directed from the fluid outlet port 260 of the secondary governor valve 86' to the fluid inlet port 246 of the primary governor valve 86 through the passageway 272 is precluded from being passed to the fluid outlet port 248 of the primary governor valve 86 by the second circumferential land 254 of the primary governor valve spool 250 closing the port 248. When the above mentioned predetermined value is reached by the revolution speed of the transmission output shaft, the force of the spring 256 of the primary governor valve 86 is overcome by the centrifugal force exerted on the valve spool 250 and allows the valve spool 250 to move radially away from the transmission output shaft. Communication is now established between the fluid inlet and outlet ports 246 and 248 of the primary and secondary governor valves 86 and 86' through the circumferential groove between the lands 252 and 254 of the valve spool 250, with the result that the governor pressure Pg which has been developed in the fluid inlet port 246 is allowed into the fluid outlet port 248 of the primary governor valve 86. The primary governor valve 86 is thus operative to pass the governor pressure Pg therethrough when the governor pressure Pg is higher than the predetermined value. The governor pressure Pg delivered from the fluid outlet port 248 of the primary governor valve 86 is distributed by way of a governor pressure circuit 274 to transmission gear shift valves incorporated into the hydraulic control system.

The transmission gear shift valves provided in the hydraulic control system herein shown comprises a first-second gear shift valve 276 for automatically controlling shifts between the first and second forward drive gear positions in the automatic forward drive range "D" or in the manual first forward drive range "1". The firstsecond gear shift valve 276 is provided in an elongated valve chamber 278 formed in the previously mentioned transmission control valve body and closed at both axial ends thereof. The valve chamber 278 has a governor pressure port 280, first line pressure inlet and outlet ports 282 and 284, second line pressure inlet and outlet ports 286 and 288, a line pressure feedback port 290, a first-gear trigger port 292, a first-gear holding port 294, and a drain port 296. The governor pressure port 280 and the line pressure feedback port 290 are located at the opposite axial ends, respectively, of the valve chamber 278. The first-gear trigger and holding ports 292 and 294 are located next to the governor pressure port 280 with the port 294 located between the other two, and the second line pressure inlet and outlet ports 286 and 288 are located next to the feedback port 290 with the port 286 located between the other two. The first line pressure inlet and outlet ports 282 and 284 are located next to the first-gear trigger port 292 and the second line pressure outlet port 288, respectively, with the drain port 296 located between the first and second line pressure outlet ports 284 and 288 as shown. The governor pressure port 280 is in constant communication with the governor pressure circuit 274. The first line pressure inlet port 282 is in constant communication with the fifth line pressure outlet port 176 of the manually operated gear position selector valve 160 through a fluid passageway 298. The first line pressure outlet port 284 and the line pressure feedback port 290 are jointly in constant communication with the fluid chamber for the low-and-reverse brake 68 through a brake actuating fluid circuit 300. The second line pressure inlet port 286 is in constant communication with the previously described clutch actuating fluid circuit 204 leading from the third fluid outlet port 172 of the gear position selector valve 160 to the fluid chamber for the forward drive clutch 42.

Within the valve chamber 278 of the first-second gear shift valve 276 is mounted a valve spool 302 which is axially movable in the valve chamber and which is formed with first, second, third fourth and fifth circumferential lands 304, 306, 308, 310 and 312. The lands 304, 306, 308, 310 and 312 are axially spaced apart from each other with the first and fifth circumferential lands 304 and 312 located at the opposite axial ends of the valve spool 302 and thus form a circumferential groove between every adjacent two of the lands. The groove between the second and third circumferential lands 306 and 308 and the groove between the third and fourth circumferential lands 308 and 310 are constantly open to the first and second line pressure outlet ports 284 and 288, respectively, irrespective of the axial position of the valve spool 302 within the valve chamber 278. The valve spool 302 thus configured is movable within the valve chamber 278 between a first axial position closing the first control port 292 by the second circumferential land 306 and providing communication between the first line pressure inlet and outlet ports 282 and 284 through the groove between the second and third circumferential lands 306 and 308 and communication between the second line pressure outlet port 288 and the drain port 296 through the groove between the third and fourth circumferential lands 308 and 310 as indicated by the lower half of the valve spool 302, and a second axial position closing the second control port 294 by the first circumferential land 304 and providing communication between the first line pressure outlet port 284 and the drain port 296 and communication between the second line pressure inlet and outlet ports 286 and 288 as indicated by the upper half of the valve spool 302. When the valve spool 302 is in the first axial position thereof, the groove between the fourth and fifth circumferential lands 310 and 312 of the valve spool is open to the second line pressure inlet port 286.

The second, third and fourth circumferential lands 306, 308 and 310 have substantially equal cross sectional areas which are smaller than the first circumferential land 304 and larger than the fifth circumferential land 312. Differential pressure acting areas are thus formed between the first and second circumferential lands 304 and 306 and between the fourth and fifth circumferential lands 310 and 312. The valve spool 302 thus constructed is urged to move toward the first axial position thereof by means of a preloaded helical compression spring 314 which is seated at one end on a wall surface at one axial end of the valve chamber 278 and at the other end on an internal end face formed in the valve spool 302.

When the vehicle is at a halt with the transmission output shaft held at rest or being driven rearwardly with the reverse drive gear position "R" selected, there is no fluid pressure developed in the governor pressure port 280. Under these conditions, the valve spool 302 of the first-second gear shift valve 276 is maintained in the first axial position thereof by the force of the spring 314 in the absence of a fluid pressure in the governor pressure port 280. If, in this instance, the transmission gear shift lever is in the parking or reverse drive gear position "P" or "R", there is a line pressure Pl developed in the first-gear holding port 294 and, through the first line pressure inlet and outlet ports 282 and 284, in the line pressure feedback port 290 so that the force of the spring 314 holding the valve spool 302 in the first axial position thereof is reinforced by the force resulting from the line pressure developed in the line pressure feedback port 290 and the force produced by the line pressure acting on the differential pressure acting area between the first and second circumferential lands 304 and 306 of the valve spool 302 from the first-gear holding port 294.

When the transmission gear shift lever is then moved to the automatic forward drive range position "D" and the vehicle is started, the line pressure which has been developed in the line pressure feedback port 290 is discharged through the low-and-reverse brake actuating fluid circuit 300 and, in turn, the line pressure is developed in the second line pressure inlet port 286 through the forward drive clutch actuating fluid circuit 298. The line pressure which has been developed in the first-gear holding port 294 is replaced with a fluid pressure which is lower than the line pressure Pl. Under these conditions, the valve spool 302 is urged to hold the first axial position not only by the force of the spring 314 but by the sum of the force resulting from the line pressure acting on the differential pressure acting area between the fourth and fifth circumferential lands 310 and 312 and the force resulting from the fluid pressure acting on the differential pressure acting area between the first and second circumferential lands 304 and 306. The forces thus urging the valve spool 302 to stay in the first axial position thereof is opposed by a force which is produced by the governor pressure Pg developed in the governor pressure port 280 and acting on the outer end face of the first circumferential land 304 of the valve spool 302 with the transmission output shaft being driven for rotation in the forward direction. Until the vehicle speed reaches a certain value, however, the force thus produced by the governor pressure acting on the valve spool 302 is overcome by the opposing forces being exerted on the spool as above described so that the valve spool 302 is held in situ. When the vehicle speed increases beyond such a value, the force resulting from the governor pressure Pg acting on the end face of the land 304 overcomes the opposing forces and causes the valve spool 302 to move toward the second axial position thereof as the governor pressure increases with the vehicle speed. When the valve spool 302 is thus axially displaced away from the first axial position thereof, the groove between the fourth and fifth circumferential lands 210 and 312 of the valve spool 302 is isolated from the second line pressure inlet port 286 by the fourth circumferential land 310, which accordingly cuts off the line pressure which has been acting on the differential pressure acting area between the fourth and fifth circumferential lands 310 and 312 of the valve spool 302. Only the force of the spring 314 and the force resulting from the fluid pressure acting on the differential pressure acting area between the first and second circumferential lands 304 and 306 oppose the force resulting from the governor pressure acting on the end face of the first circumferential land 304 and, therefore, allows the valve spool 302 to move at a stroke into the second axial position thereof. The valve spool 302 being thus moved to the second axial position thereof, communication is provided between the second line pressure inlet and outlet ports 286 and 288 through the groove between the third and fourth circumferential lands 308 and 310 of the valve spool 302 with the result that the line pressure Pl which has been introduced into the second line pressure inlet port 286 through the forward drive clutch actuating fluid circuit 298 is passed to the second line pressure outlet port 288.

The line pressure Pl admitted to the port 288 of the first-second gear shift valve 276 is directed to the brake-apply fluid chamber 76 of the servo unit 74 for the brake band 72 through a second-gear position lock valve 316 which is adapted to hold the brake band 72 applied when the manual forward drive range "2" is selected. The second-gear position lock valve 316 comprises an elongated valve chamber 318 formed in the transmission control valve body. The valve chamber 318 has a control port 320, first and second line pressure inlet ports 322 and 324, and a line pressure outlet port 326. The control port 320 is open at an open axial end of the valve chamber 318, and the second line pressure inlet port 324 is open adjacent to the other axial end of the valve chamber 318. The first line pressure inlet port 322 and the line pressure outlet port 326 are located intermediate between and respectively closer to these ports 320 and 324 as shown. The first line pressure inlet port 322 is in communication with the second line pressure outlet port 288 of the above described first-second gear shift valve 276 through a fluid passageway 328, while the second line pressure inlet port 324 is in constant communication with the second line pressure outlet port 170 of the manually operated gear position selector valve 160 through a fluid passageway 329. The line pressure outlet port 326 of the second-gear position lock valve 316 is in constant communication with the brake-apply fluid chamber 76 of the band servo unit 74 of the brake band 72 through a band actuating fluid circuit 330. On the other hand, the control port 320 of the second-gear position lock valve 316 is in constant communication with the gear position selector valve 160 through a fluid passageway 331 as shown.

Within the valve chamber 318 thus formed is mounted a valve spool 332 which is axially slidable in the valve chamber 318 and which has first, second and third circumferential lands 334, 336 and 338 arranged in this sequence away from the first control port 320. The lands 334, 336 and 338 of the valve spool 332 are axially spaced apart from each other and thus form circumferential grooves therebetween. The groove between the first and second circumferential lands 334 and 336 is constantly open to the line pressure outlet port 326 irrespective of the axial position of the valve spool 332 and is permitted to be open to the line pressure outlet port 326 depending upon the axial position of the valve spool 332 within the valve chamber 318. On the other hand, the groove between the second and third circumferential lands 336 and 338 is constantly open to the second line pressure inlet port 324 irrespective of the axial position of the valve spool 332 within the valve chamber 318 and is permitted to be open to the line pressure outlet port 326 depending upon the axial position of the valve spool 332 within the valve chamber 318. The valve spool 332 is thus movable within the valve chamber 318 between a first axial position providing communication between the first line pressure inlet port 322 and the line pressure outlet port 326 through the groove between the first and second circumferential lands 334 and 336 and having the groove between the second and third circumferential lands 336 and 338 open to the second line pressure inlet port 324 but isolated from the line pressure outlet port 326 as indicated by the right half of the valve spool 332, and a second axial position providing communication between the second line pressure inlet port 324 and the line pressure outlet port 326 through the groove between the second and third circumferential lands 336 and 338 and having the groove between the first and second circumferential lands 334 and 336 open to the first line pressure inlet port 322 but isolated from the line pressure outlet port 326 as indicated by the laft half of the valve spool 332. The valve spool 332 is urged to move within the valve chamber 318 toward the first axial position thereof by means of a preloaded helical compression spring 340 which is shown seated at one end on a wall surface at one axial end of the valve chamber 318 and at the other end thereof on an internal end face formed in the valve spool 332. The first and second circumferential lands 334 and 336 of the valve spool 332 are substantially equal in cross sectional area to each other but are larger in cross sectional area than the third circumferential land 338 so that there is a differential pressure acting area formed between the second and third circumferential lands 336 and 338 of the valve spool 332.

In each of the ports 320, 322, 324 and 326 thus arranged of the second-gear position lock valve 316 is to be developed a line pressure Pl under predetermined conditions. In the absence of a fluid pressure in each of these ports 320, 322, 324 and 326, particularly in the second line pressure inlet port 324, the valve spool 326 is held in the first axial position thereof by the force of the spring 340. When there is a line pressure developed in the second line pressure inlet port 324 in the absence of a fluid pressure in the control port 320, the force of the spring 340 urging the valve spool 332 to move toward the first axial position thereof is overcome by the force resulting from the line pressure acting on the differential pressure acting area between the second and third circumferential lands 336 and 338 of the valve spool 332 and allows the valve spool 332 to move into the second axial position thereof. When the valve spool 332 is thus moved into the second axial position thereof, communication is provided between the first line pressure inlet port 322 and the line pressure outlet port 326 so that, if there is a line pressure developed in the first line pressure inlet port 322 under this condition, the line pressure is passed over to the band actuating fluid circuit 330 through the line pressure outlet port 326 of the second-gear position lock valve 316. Under conditions in which the line pressure is developed in the control port 320 as well as the second line pressure inlet port 324, the force urging the valve spool 332 to move toward the second axial position thereof is opposed not only by the force of the spring 340 but by the force resulting from the line pressure thus developed in the control port 320 and is therefore overcome by the sum of the opposing forces. The valve spool 332 is now moved back from the second axial position into the first axial position thereof and provides communication between the first line pressure inlet port 322 and the line pressure outlet port 326. If, under these conditions, the line pressure is present in the second line pressure outlet port 288 of the first-second gear shift valve 276 as previously described, the line pressure is directed through the fluid passageway 328 to the first line pressure inlet port 322 of the first-gear position lock valve 316 and is passed through the line pressure outlet port 326 of the lock valve 316 to the band actuating fluid circuit 330.

The transmission gear shift valves of the hydraulic control system embodying the present invention further comprise a second-third gear shift valve 324 which is arranged in series with a pressure modulator valve 344 cooperative with the gear shift valve 342. The second-third gear shift valve 342 and the pressure modulator valve 344 are provided in a column elongated valve chamber 346 which is formed in the previously mentioned transmission control valve body and which is closed at both axial ends. The valve chamber 346 has for the second-third gear shift valve 342 a governor pressure port 348, first and second line pressure inlet ports 350 and 352, a line pressure outlet port 356, a second-gear holding port 354, and a drain port 358 and, for the pressure modulator valve 344, a throttle pressure inlet port 360, first and second throttle pressure relief ports 362 and 364, and a control port 366. The governor pressure port 348 for the second-third gear shift valve 342 is located adjacent to one closed axial end of the valve chamber 346 and the throttle pressure inlet port 360 for the pressure modulator valve 344 is located adjacent to the other closed axial end of the valve chamber 346. The second-gear holding port 354 and the first and second line pressure inlet ports 350 and 352 are arranged in this sequence away from the governor pressure port 348 with the line pressure outlet port 356 located intermediate between the line pressure inlet ports 350 and 352 and with the drain port 358 located intermediate between the second-gear holding port 356 and the governor pressure port 348 as shown. The first throttle pressure relief port 362 for the pressure modulator valve 344 is located between the throttle pressure inlet port 360 and the control port 366 for the pressure modulator valve 344, while the second throttle pressure relief port 364 is located axially between the control port 366 for the pressure modulator valve 344 and the second line pressure inlet port 352 for the second-third gear shift valve 342. The governor pressure port 348 for the second-third gear shift valve 342 is in constant communication with the previously described governor pressure circuit 274. The first line pressure inlet port 350 of the second-third gear shift valve 342 is in constant communication with the previously described fluid circuit 206 leading from the sixth line pressure outlet port 178 of the manually operated gear position selector valve 160 to the line pressure port 150 of the line pressure booster valve 146. The line pressure outlet port 356 is in constant communication with the brake-release fluid chamber 76' of the band servo unit 74 through a band releasing fluid circuit 370. The second line pressure inlet port 352 and the second-gear holding port 354 of the second-third gear shift valve 342 are in constant communication with each other and further jointly communicate through a fluid passageway 372 with the previously mentioned fluid passageway 331 leading from the first line pressure outlet port 168 of the manually operated gear position selector valve 160 to the central port 320 of the second-gear position locking valve 316. The fluid pressure 372 thus leading to the second line pressure inlet port 352 and the second-gear holding port 354 of the second-third gear shift valve 342 is provided with a one-way orifice check valve 373 which is adapted to allow fluid to pass at a restricted rate therethrough toward the ports 352 and 354 of the gear shift valve 342 but to pass without substantial restriction therethrough when fluid flows backwardly away from the ports 352 and 354 of the valve 342. On the other hand, the first and second throttle pressure relief ports 362 and 364 of the pressure modulator valve 344 are in communication with each other and further communicate jointly through a fluid passageway 375 with the first-gear holding port 294 of the first-second gear shift valve 276 as shown.

Within the valve chamber 346 thus formed is slidably mounted a valve spool 376 which forms part of the second-third gear shift valve 342 and which is axially movable in the valve chamber 346. The valve spool 376 is formed with first, second, third and fourth circumferential lands 378, 380, 382 and 384 which are arranged in this sequence away from the governor pressure port 348. The lands 378, 380, 382 and 384 are axially spaced apart from each other with the first and fourth circumferential lands 378 and 384 located at the opposite axial ends of the spool 376 and have a circumferential groove formed between every adjacent two of the lands. The groove between the first and second circumferential lands 378 and 380 is constantly open to the drain port 358 irrespective of the axial position of the valve spool 376 within the valve chamber 346. The groove between the second and third circumferential lands 380 and 382 is open to the first line pressure inlet port 350 or the second-gear holding port 354 depending upon the axial position of the valve spool 376 within the valve chamber 346. The groove between the third and fourth circumferential lands 382 and 384 is open to both of the first line pressure inlet port 350 and the line pressure outlet port 356 or to both of the second line pressure inlet port 352 and the line pressure outlet port 356 depending upon the axial position of the valve spool 376 within the valve chamber 346. The valve spool 376 of the second-third gear shift valve 342 is, thus, movable within the valve chamber 346 between a first axial position having the groove between the second and third circumferential lands 380 and 382 open to the second-gear holding port 354 and providing communication between the first line pressure inlet port 350 and the line pressure outlet port 356 through the groove between the third and fourth circumferential lands 382 and 384 as indicated by the lower half of the valve spool 376, and a second axial position having the groove between the second and third circumferential lands 380 and 382 open to the second-gear holding port 354 and providing communication between the second line pressure inlet port 352 and the line pressure outlet port 356 through the groove between the third and fourth circumferential lands 382 and 384 of the valve spool 376 as indicated by the upper half of the valve spool 376. The second-gear holding port 354 is closed by the second circumferential land 380 of the valve spool 376 when the valve spool 376 is in the second axial position thereof, and the second line pressure inlet port 352 is closed by the fourth circumferential land 384 when the valve spool 376 is in the first axial position thereof. The first, second and third circumferential lands 378, 380 and 382 are larger in cross section in this sequence and the fourth circumferential land 384 is substantially equal in cross section to the third circumferential land 382, as shown. A differential pressure acting area is thus formed between the second and third circumferential lands 380 and 382. A differential pressure acting area is also provided between the first and second circumferential lands 378 and 380 but such an area is not acted upon by a fluid pressure because the groove between the lands 378 and 380 is constantly open to the drain port 358 as above noted. The fourth circumferential land 384 of the valve spool 376 is formed with a bore which is open at the outer axial end of the land 384 and closed by an internal end face in the land 384.

On the other hand, the pressure modulator valve 344 comprises a valve plunger 386 which is axially slidable within the valve chamber 346 and which has one axial end adjacent to the throttle pressure inlet port 360. The valve plunger 386 has an outer axial extension 388 axially projecting opposite to the valve spool 376 of the second-third gear shift valve 342 and an inner axial extension 390 axially projecting into the above mentioned bore in the fourth circumferential land 384 of the valve spool 376 of the second-third gear shift valve 342. The inner axial extension 388 of the valve plunger 386 is engageable at its leading end with a closed wall surface of the valve chamber 346 adjacent to the throttle pressure inlet port 360 for the pressure modulator valve 344, while the inner axial extension 392 of the valve plunger 386 is engageable at its leading end with the internal end free face in the fourth circumferential land 384 of the second-third gear shift valve spool 376. The valve plunger 386 thus formed with the outer and inner axial extensions 388 and 390 has axially outer and inner circumferential edges. The valve plunger 386 thus constructed is axially movable within the valve chamber 346 between a limit axial position having the outer axial extension 388 bearing at its leading end against the above mentioned closed end wall surface of the valve chamber 346 as indicated by the upper half of the valve plunger 386, and an equilibrium axial position displaced a certain distance away from the closed end wall surface of the valve chamber 346 as indicated by the lower half of the valve plunger 386. The valve plunger 386, the first throttle pressure relief port 362 and the control port 366 of the pressure modulator valve 344 are arranged so that, when the valve plunger 386 is in the above mentioned equilibrium axial position thereof, there are established along the axially outer and inner circumferential edges of the valve spool 386 a slight clearance between the throttle pressure inlet port 360 and the first throttle pressure relief port 362 and a clearance between the control port 366 and the space between the valve plunger 386 and the valve spool 376 of the second-third gear shift valve 342.

The valve spool 376 of the second-third gear shift valve 342 and the valve plunger 386 of the pressure modulator valve 344 thus constructed and arranged are urged to be axially spaced apart from each other within the valve chamber 346 by means of a preloaded helical compression spring 392 which is seated at one end on the internal end face within the fourth land 384 of the valve spool 376 and at the other end on the annular face of the valve plunger 386 forming the above mentioned axially inner circumferential edge.

When the vehicle is at a halt with the transmission output shaft held at rest or being driven rearwardly with the reverse drive gear position "R" selected in the transmission system, there is no fluid pressure developed in the governor pressure port 348 of the second-third gear shift valve 342. The valve spool 376 of the second-third gear shift vlave.342 is therefore maintained in the first axial position thereof by the force of the spring 392. If, under these conditions, a fluid pressure is developed in the throttle pressure inlet port 360, a force is exerted on the valve plunger 386 of the modulator valve 344 by the fluid pressure in the throttle pressure port 360 and urges the valve plunger 386 to move away from the above mentioned limit position thereof toward the valve spool 376 of the second-third gear shift valve 342. If such a force is smaller than the force of the spring 392 and the control port 366 is held in a condition drained off, the valve plunger 386 of the modulator valve 344 is moved away from the limit position thereof to a certain axial position having the axially outer circumferential edge of the plunger located past the first throttle pressure relief port 362 and thereby allowing the throttle pressure inlet port 360 to be open to the first throttle pressure relief port 362. The fluid in the throttle pressure inlet port 360 is therefore admitted through the first and second throttle pressure relief ports 362 and 364 into an open space between the valve plunger 386 and the valve spool 376 of the second-third gear shift valve 342. The first throttle pressure relief port 362 being fully open, the control port 366 is fully closed by the valve plunger 386 so that there is developed a fluid pressure in the space and, in cooperation with the spring 392, urges the valve plunger 386 to move back toward the initial limit axial position thereof. When the valve plunger 386 thus moved back toward the initial limit axial position thereof reaches another certain position, the first throttle pressure relief port 362 is fully closed and, in turn, there is a clearance formed between the control port 366 and the space between the valve spool and plunger 376 and 386 past the axially inner circumferential edge of the valve plunger 386 with the result that the fluid pressure which has been developed in the space between the valve spool and plunger 376 and 386 is discharged through the control port 366 in the drained condition. The fluid pressure in the throttle pressure inlet port 360 will for a second time forces the valve plunger 386 to move away from the limit axial position thereof for forming a clearance between the throttle pressure inlet port 360 and the first throttle pressure relief port 362 past the axially outer circumferential edge of the valve plunger 386. In this fashion, the valve plunger 386 of the pressure modulator valve 344 attempts to remain stable in the previously mentioned equilibrium axial position maintaining a slight clearance between the throttle pressure inlet port 360 and the first throttle pressure relief port 362 and a clearance between the control port 366 and the space between the valve spool and plunger 376 and 386. The fluid pressure admitted from the throttle pressure inlet port 360 into space between the valve spool and plunger 376 and 386 through the first and second throttle pressure relief sports 362 and 364 is partially discharged through the clearance formed at the control port 360 and as a consequence there is developed in the space between the valve spool and plunger 376 and 386 a fluid pressure which is lower than the fluid pressure in the throttle pressure inlet port 360 by a substantially fixed value which is dictated by the force of the spring 392.

The fluid pressure to be developed in the throttle pressure inlet port 360 of the above described second-third gear shift valve 342 (and the throttle pressure port 148 of the line pressure booster valve 146 as well) is supplied from a transmission throttle valve 394 which is diagrammatically illustrated in FIG. 2A. While the transmission throttle valve provided in the hydraulic control system according to the present invention is responsive to kickdown conditions and other unusual conditions as will be described later, the throttle valve 394 is normally operative to produce as a third control fluid pressure to be used in the hydraulic control system a throttle pressure Pt which is continuously variable with the distance of displacement to which the accelerator pedal of a vehicle is to be depressed to cause acceleration of the vehicle. Thus, the throttle pressure Pt produced by the transmission throttle valve 394 provided in the hydraulic control system according to the present invention is continuously variable with the degree of opening of the throttle valve provided in the carburetor (not shown) of the engine with which the power transmission incorporating the hydraulic control system is to be in use, as will be described in more detail.

The fluid pressure developed between the valve spool 376 of the second-third gear shift valve 342 and the valve plunger 386 of the pressure modulator valve 344 by the action of the pressure modulator valve 344 when the valve spool 376 of the gear shift valve 342 is in the first axial position thereof as above described is, thus, continuously variable with and lower by a predetermined value than the throttle pressure Pt developed in the throttle pressure inlet port 360. The "modulated" throttle pressure developed between the second-third gear shift valve 342 and the pressure modulator valve 344 acts not only on the valve plunger 386 of the pressure modulator valve 344 but on the valve spool 376 of the gear shift valve 342 so that the valve spool 376 is urged to stay in the first axial position thereof not only by the force of the spring 392 but by the force resulting from the modulated throttle pressure acting thereon.

When, under these conditions, the transmission gear shift lever is moved to the automatic drive range position "D" and the vehicle is started, the governor pressure Pg developed in the governor pressure circuit 274 increases as the vehicle speed increases with the accelerator pedal depressed. When the vehicle speed reaches a first predetermined value, the governor pressure Pg causes the first-second gear shift valve 276 to move into the second axial position effecting in the transmission mechanism shown in FIG. 1 an upshift from the first gear ratio ($D_1$) to the second gear ratio ($D_2$) in the automatic forward drive range (D) of the transmission system.

When any of the forward drive gear-ratio conditions is established in the transmission system, a line pressure Pl is developed in the second line pressure inlet port 352 and accordingly the second-gear holding port 354 of the second-third gear shift valve 342 as will be described in more detail. The line pressure thus developed in the second line pressure inlet port 352 of the second-third gear shift valve 342 acts on the differential pressure acting area between the second and third circumferential lands 380 and 382 of the valve spool 376 of the gear shift valve 342 with the result that the valve spool 376 is urged to stay in the first axial position thereof not only by the force of the spring 392 and the force produced by the modulated throttle pressure as above described but by the force resulting from the line pressure Pl thus acting on the differential pressure acting area of the valve spool 376. The governor pressure Pg urging the valve spool 376 of the second-third gear shift valve 342 from the governor pressure port 348 of the valve 342 at the point of time when the valve spool 302 of the first-second gear shift valve 276 is moved into the second position thereof is therefore overcome by the sum of the opposing forces exerted by the spring 392, the line pressure in the second line pressure inlet port 352 and modulated throttle pressure developed between the second-third gear shift valve 342 and the pressure modulator valve 344.

When the vehicle speed increasing with the accelerator pedal kept depressed reaches a second predetermined value, the force resulting from the governor pressure Pg acting on the valve spool 376 of the second-third gear shift valve 342 overcomes the opposing forces being exerted on the valve spool 376, which is accordingly caused to move away from the first axial position thereof against such opposing forces. At a point of time when the valve spool 376 thus moved toward the second axial position reaches an axial position closing the second-gear holding port 354 by the second circumferential land 380 of the spool 376, the force resulting from the line pressure which has been acting on the differential pressure acting area between the second and third circumferential lands 380 and 382 from the port 350 is eliminated. The governor pressure Pg acting on the valve spool 376 of the second-third gear shift valve 342 is now opposed only by the force of the spring 392 and the modulated throttle pressure which is present between the valve spool 376 of the second-third gear shift valve 342 and the valve plunger 382 of the pressure modulator valve 344. The valve spool 376 of the second-third gear shift valve 342 is therefore moved at a stroke into the second axial position thereof upon movement of the valve spool 376 to the above mentioned axial position closing the second-gear holding port 354 of the gear shift valve 342. The valve spool 376 of the second-third gear shift valve 342 being thus moved into the second axial position thereof, there is provided communication between the second line pressure inlet and outlet ports 352 and 356 of the gear shift valve 342 so that the line pressure Pl which has been developed in the line pressure inlet port 352 is passed to the line pressure outlet port 356 through the groove between the third and fourth circumferential lands 382 and 384 of the vslve spool 376, thereby effecting in the transmission mechanism shown in FIG. 1 an upshift from the second gear ratio ($D_2$) to the third gear ratio ($D_3$) in the automatic forward drive range "D". When the valve spool 376 of the second-third gear shift valve 342 is in these manners moved to the second axial position thereof, the valve plunger 386 of the pressure modulator valve 344 is forcibly moved back to the first axial position thereof with the inner axial extension 390 bearing at its leading end against the internal end face in the valve spool 376 of the second-third gear shift valve 342 and with the outer axial extension 388 bearing at its end against the end wall surface of the valve chamber 346 adjacent to the throttle pressure port 360 of the pressure modulator valve 344. With the valve plunger 386 of the pressure modulator valve 344 thus held in the first axial position thereof, the first throttle pressure relief port 362 is completely closed by the valve plunger 386 and at the same time the control port 366 is kept open, establishing communication between the second throttle pressure relief port 364 and the control port 366. If, in this instance, the control port 366 is in a condition drained off, the modulated throttle pressure which has been present between the second-third gear shift valve 342 and the pressure modulator valve 344 is now discharged through the control port 366. Under these conditions, the governor pressure Pg acting on the valve spool 376 of the second-third gear shift valve 342 is opposed only by the throttle pressure Pt acting on the valve plunger 386 of the pressure modulator valve 344 so that the valve spool 376 of the second-third gear shift valve 342 is permitted to move back to the first axial position thereof when the governor pressure Pg is reduced to a level which is lower than the value at which the valve spool 376 has been initiated into motion to move from the first axial position to the second axial position thereof. This means that a downshift from the third gear ratio ($D_3$) to the second gear ratio ($D_2$) in the automatic forward drive range "D" occurs at a vehicle speed lower than the vehicle speed at which an upshift is to be made from the second gear ratio ($D_2$) to the third gear ratio (D₃) in the automatic forward drive range "D" if the throttle pressure Pt and accordingly the opening degree of the carburetor throttle valve are kept unchanged. More precisely, an upshift between the second and third gear ratios in the automatic forward drive range takes place when the vehicle speed is increased and/or the opening degree of the carburetor throttle valve is reduced with respect to a first predetermined relationship between the vehicle speed and the carburetor throttle valve opening degree, while a downshift therebetween is effected when the vehicle speed is reduced and/or the opening degree of the carburetor throttle valve is increased with respect to a second predetermined relationship between the vehicle speed and the carburetor throttle valve opening degree. The first predetermined relationship above mentioned is dictated by the force of the spring 392, and the ratios between the first, second, third and fourth circumferential lands 378, 380, 382 and 384 of the valve spool 376 of the gear shift valve 342 and the cross sectional area of the valve spool 386 of the pressure modulator valve 344, while the second predetermined relationship above mentioned is dictated simply by the ratio between the cross sectional area of the first circumferential land 378 of the gear shift valve spool 376 and the cross sectional area of the pressure modulator valve plunger 386 in the absence of a fluid pressure in the first line pressure inlet port 350 of the gear shift valve 342 under forward drive gear conditions of the transmission system. As will be discussed later, a fluid pressure (line pressure) is to be developed in this port 350 of the valve 342 only under a reverse drive gear condition of the transmission system.

The control port 366 of the pressure modulator valve 344 is used not only for the purpose of releasing an excess of throttle pressure therethrough when the second-third gear shift valve 342 is in the second gear ratio condition and discharging the modulated throttle pressure therethrough when the gear shift valve 342 is in the third gear ratio condition as above described but for the purpose of forcibly moving the valve spool 376 of the second-third gear shift valve 342 back to the first axial position and accordingly making a forced downshift from the third ratio to the second gear ratio in the automatic forward drive range when the accelerator pedal is depressed throughout its distance of stroke as will be discussed in more detail. A similar function is obtainable in the first-second gear shift valve 276. In the case of the first-second gear shift valve 276, a line pressure Pl is developed in the first-gear trigger port 292 when the accelerator pedal is depressed all the way down. If the valve spool 302 of the first-second gear shift valve 276 is in the second axial position thereof when the line pressure is thus introduced into the port 292, the line pressure acts on the differential pressure acting area between the first and second circumferential lands 304 and 306 of the valve spool 302, which is therefore forced to move from the second axial position to the first axial position thereof even though the governor pressure Pg opposing such movement of the valve spool 302 may be at a considerably high level.

Under predetermined conditions (as when the transmission gear shift lever is in the manual second forward drive range position "2"), the transmission throttle valve 394 delivers a substantially constant fluid pressure higher than the throttle pressure Pt. Such a contant fluid pressure, herein referred to as throttle back-up pressure, is developed by a throttle back-up valve 396 illustrated beside the throttle valve 394.

The throttle back-up valve 396 comprises an elongated valve chamber 398 formed in the transmission control valve body and closed at both axial ends thereof. The valve chamber 398 has first and second line pressure ports 400 and 402, a throttle back-up pressure port 404 and a drain port 406, which are arranged in this sequence away from one axial end of the valve chamber 398. The first line pressure port 400 is in constant communication with the previously mentioned brake actuating fluid circuit 300 leading from the first line pressure outlet port 284 of the first-second gear shift valve 276 to the fluid chamber of the low-and-reverse brake 68. The second line pressure port 402 of the throttle back-up valve 396 is in constant communication with the fourth line pressure outlet port 174 of the manually operated gear position selector valve 160 through a fluid passageway 408. Within the valve chamber 398 thus formed is mounted a valve spool 410 which is axially slidable in the valve chamber 398. The valve spool 410 has first, second and third circumferential lands 412, 414 and 416 which are axially spaced apart from each other so as to form a circumferential groove between every adjacent two of them. The groove formed between the first and second circumferential lands 412 and 414 of the valve spool 410 is open selectively to the first or second line pressure port 400 or 402 depending upon the axial position of the valve spool 410 within the valve chamber 398, while the groove formed between the second and third circumferential lands 414 and 416 is constantly open to the throttle back-up pressure port 404 without respect to the axial position of the valve spool 410 and is isolated from or open to the drain port 406 depending upon the axial position of the valve spool 410 within the valve chamber 398. The valve spool 410 is thus movable within the valve chamber 398 between a first axial position having the groove between the first and second circumferential lands 412 and 414 open to the first line pressure port 400 and the groove between the second and third circumferential lands 414 and 416 open to both the second line pressure port 402 and the throttle back-up pressure port 404 as indicated by the left half of the valve spool 410, and a second axial position having the groove between the first and second circumferential lands 412 and 414 open to the second line pressure port 402 and the groove between the second and third circumferential lands 414 and 416 open to both the throttle back-up pressure port 404 and the drain port 406 as indicated by the right half of the valve spool 410. The lands of the throttle back-up valve spool 410 have substantially equal cross sections except for the third circumferential land 416 which is slightly larger in cross section than the remaining lands 412 and 414. Between the second and third circumferential lands 414 and 416 of the valve spool 410 is therefore formed a differential pressure acting area so that, when there is a fluid pressure developed in the circumferential groove between these lands 414 and 416, the valve spool 410 is urged to move toward the second axial position thereof. As indicated by dotted lines, the valve spool 410 is further formed with a diametrical passageway which is open at both ends to the groove between the first and second circumferential lands 412 and 414 and an axial passageway leading from the diametrical passageway and open at the outer axial end of the first circumferential land 412 of the valve spool 410. When there is a fluid pressure developed in the groove between the first and second circumferential lands 412 and 414 of the valve spool 410 therefore, the fluid pressure is conducted through these diametrical and axial passageway in the valve spool 410 and acts on the outer end face of the first circumferential land 412 of the valve spool 410, urging the valve spool 410 to move toward the second axial position thereof. In the presence of a fluid pressure acting on the differential pressure acting area between the lands 414 and 416 of the valve spool 410, the valve spool 410 is urged to move toward the second axial position thereof by the sum of the force thus produced by the fluid pressure acting on the differential pressure acting area of the valve spool 410 and the force of the fluid pressure produced by the fluid pressure acting on the first circumferential land 412 of the valve spool 410. The force or the sum of the forces thus urging the valve spool 410, to move toward the second axial position thereof is opposed by the force of a preloaded compression spring 418 which is seated at one end on a wall surface defining one axial end of the valve chamber 398 and at the other end thereof on an internal end face formed in the third circumferential land 416 of the valve spool 410 as shown.

In the absence of a fluid pressure in any of the pressure ports 400, 402 and 404 of the throttle back-up valve 396, the valve spool 410 of the valve 396 is maintained in the first axial position by the force of the spring 418 so that the first line pressure port 400 is open to the groove between the first and second circumferential lands 412 and 414 and the second line pressure port 402 and the throttle back-up pressure port 404 are jointly open to the groove between the second and third circumferential lands 414 and 416 as indicated by the left half of the valve spool 410. If a line pressure Pl is developed in the second line pressure port 402 and accordingly in the throttle back-up pressure port 404 under these conditions, the line pressure acts on the differential pressure acting area between the second and third circumferential lands 414 and 416 of the valve spool 410 and urges the valve spool 410 to move from the first axial position toward the second axial position against the force of the spring 418. When the valve spool 410 thus moved toward the second axial position reaches a certain axial position between the first and second axial positions thereof, there is formed a clearance between the throttle back-up pressure port 404 and the drain port 406 through the groove between the second and third circumferential lands 414 and 416 of the valve spool 410 and, as a consequence, the line pressure which has been developed in the throttle back-up pressure port 404 is allowed to leak into the drain port 406 through such a clearance formed between the ports 404 and 406. This gives rise to a decrease in the fluid pressure in the throttle back-up pressure port 404 and accordingly to a decrease in the amount of force urging the valve spool 410 to move toward the second axial position thereof. In this fashion, the valve spool 410 attempts to stay in a certain equilibrium axial position having the force of the spring 418 equally balanced by the force resulting from the fluid pressure acting on the differential pressure acting area between the second and third circumferential lands 414 and 416 of the valve spool 410. The fluid pressure, or the throttle back-up pressure as previously mentioned, thus developed in the throttle back-up pressure port 404 of the throttle back-up valve 410 is lower than the line pressure Pl developed in the second line pressure port 402 of the valve 396 and is maintained substantially constant at a value which is dictated by the force of the spring 418.

When the valve spool 410 of the throttle back-up valve 396 is held in the above described equilibrium axial position developing the throttle back-up pressure in the port 404 of the valve, the groove between the first and second circumferential lands 412 and 414 is open to the first line pressure port 400 of the throttle back-up valve 396. If a fluid pressure is developed in the first line pressure port 400, the fluid pressure is passed through the radial and axial passageway in the valve spool 410 and acts on the outer end face of the first circumferential land 412 of the valve spool 410. This causes the valve spool 410 to axially move into the second axial position thereof against the force of the spring 418. When the valve spool 410 is moved to the second axial position thereof, the first line pressure port 400 is closed by the first circumferential land 412 of the valve spool 410 and, in turn, the second line pressure port 402 is open to the groove between the first and second circumferential lands 412 and 414 and maintains the fluid pressure acting on the end face of the land 412. The valve spool 410 is held in the second axial position thereof until the second line pressure port 402 of the throttle back-up valve 396 is drained off. When the valve spool 410 is moved into the second axial position thereof, the throttle back-up pressure which has been developed in the throttle back-up port 404 of the throttle back-up valve 396 is discharged to the transmission oil reservoir 90 through the drain port 406 of the throttle back-up valve 396.

When the vehicle speed is higher than a predetermined value, the throttle pressure Pt delivered from the transmission throttle valve 394 is directed to the throttle pressure port 148 of the pressure regulator valve 94 for reducing the line pressure Pl being developed by the pressure regulator valve 94. For this purpose, a pressure modifier valve 424 is provided operatively between the pressure regulator valve 94 and the transmission throttle valve 394.

The pressure modifier valve 424 comprises an elongated valve chamber 426 formed in the previously mentioned transmission control valve body. The valve chamber 426 is closed at both axial ends and has a throttle pressure inlet port 428, a modified pressure outlet port 430, a governor pressure port 432 located at one axial end of the valve chamber 426 and a drain port 434 located at the other axial end of the valve chamber 426. The throttle pressure inlet port 428 and the modified pressure outlet port 430 are located intermediate between the governor pressure port 432 and the drain port 434 as shown. The modified pressure outlet port 430 communicates with the modified throttle pressure port 108 of the pressure regulator valve valve 94 through a fluid passageway 436. The governor pressure port 432 is in constant communication with the governor pressure circuit 274. The drain port 434 is open to the previously mentioned transmission oil reservoir 90. Within the valve chamber 426 thus formed is mounted a valve spool 438 which is axially slidable in the valve chamber 426 between the axial ends of the chamber. The valve spool 438 has first and second circumferential lands 440 and 442 which are axially spaced apart from each other and which thus form therebetween a circumferential groove which is constantly open to the throttle pressure inlet port 428 irrespective of the axial position of the valve spool 438 within the valve chamber 426. The valve spool 438 is axially movable in the valve chamer 426 between a first axial position providing communication between the modified pressure outlet port 430 and the drain port 434 as indicated by the lower half of the valve spool 438, and a second axial position blocking the communication between the ports 430 and 434 and, in turn, providing communication between the throttle pressure inlet and modified pressure outlet ports 428 and 430 through the circumferential groove between the lands 440 and 442 as indicated by the upper half of the valve spool 438. The valve spool 438 is urged to move toward the first axial position tereof by means of a preloaded helical compression spring 444 which is seated at one end of the valve chamber 426 adjacent to the drain port 434 and at the other axial end on the outer face of the second circumferential land 442 as shown. The first circumferential land 440 of the valve spool 438 is larger in cross sectional area than the second circumferential land 442 of the spool so that a differential pressure acting area is formed between the first and second circumferential lands 440 and 442 of the valve spool 438. When there is a throttle pressure Pt developed in the groove between the first and second circumferential lands 440 and 442 of the valve spool 438, therefore, the valve spool 438 is urged to move toward the first axial position thereof not only by the force of the spring 444 but by a force produced by the throttle pressure thus acting on the differential pressure acting area of the valve spool 438. In the presence of a governor pressure Pg developed in the governor pressure port 432 under these conditions, the forces thus urging the valve spool 438 to move toward the first axial position of the spool are opposed by a force which is produced by the governor pressure Pg acting on the outer end face of the first circumferential land 440 and urging the valve spool 438 to move toward the second axial position thereof. In an attempt to assume an equilibrium axial position between the first and second axial position thereof, the valve spool 438 of the pressure modifier valve 424 is thus operative to develop in the modified pressure outlet port 430 a modified throttle pressure with which the force resulting from the governor pressure Pg acting on the first circumferential land 440 of the valve spool 438 is substantially equally balanced with the sum of the force of the spring 444 and the force produced by the modified throttle pressure acting on the differential pressure acting area between the first and second circumferential lands 440 and 442 of the valve spool 438. The modified throttle pressure thus appearing at the modified pressure outlet port 430 of the pressure modifier valve 424 is continuously variable not only with the throttle pressure Pt and accordingly the opening degree of the carburetor throttle valve but with the governor pressure Pg and accordingly the road speed of the vehicle. The modified throttle pressure produced by the pressure modifier valve 424 in this manner is passed through the fluid passageway 436 to the modified throttle pressure port 108 of the pressure regulator valve 94 and serves to reduce the line pressure Pl depending upon a predetermined relationship between the road speed of the vehicle and the opening degree of the carburetor throttle valve. The above mentioned predetermined relationship is dictated by the force of the spring 444 and the difference between the respective cross sectional areas of the first and second circumferential lands 440 and 442 of the valve spool 438 of the pressure modifier valve 424.

The throttle pressure inlet port 428 of the pressure modifier valve 424 is in constant communication with a throttle pressure circuit 446 leading from the transmission throttle valve 394 to not only the port 428 of the pressure modifier valve 424 but the throttle pressure port 360 of the second-third gear shift valve 342.

The throttle pressure Pt delivered from the transmission throttle valve 394 to the throttle pressure circuit 446 as above described is further directed to a second-third gearshift timing valve 452 which is adapted to retard the timings with which the high-and reverse clutch 40 is to be coupled and uncoupled as compared with the timings at which the brake band 72 is to be released and applied, respectively, under predetermined conditions in which the vehicle speed is low as compared with the torque output being delivered from the engine when shifting is to be effected between the second and third gear ratios in any of the forward drive ranges.

The second-third gearshift timing valve 452 comprises an elongated valve chamber 454 formed in the transmission control valve body. The valve chamber 454 has a governor pressure port 456 which is open at one axial end of the valve chamber 454, a throttle pressure port 458 open to the valve chamber 454 at the other axial end of the valve chamber 454, line pressure inlet and outlet ports 460 and 462 located intermediate between and respectively closer to the governor and throttle pressure ports 456 and 458, and a drain port 464 located between the governor pressure port 456 and the line pressure inlet port 460, as shown. The governor pressure port 456 is in constant communication with the governor pressure circuit 274, and the throttle pressure port 458 is in constant communication with the above mentioned throttle pressure circuit 446. The line pressure inlet port 460 is in constant communication with the previously described band releasing fluid circuit 370 and through a high-and-reverse clutch actuating fluid circuit 466 and a calibrated orifice 468 provided in the passageway 466 with the fluid chamber for the high-and-reverse clutch 40. The line pressure outlet port 462 is in communication with the high-and-reverse clutch actuating fluid circuit 466 without passing through the orifice 468. The valve chamber 454 thus formed has axially slidably mounted therein a valve spool 470 having first, second and third circumferential lands 472, 474 and 476 of which the first and third circumferential lands 472 and 476 are located adjacent to the governor and throttle pressure ports 456 and 458, respectively, the lands 472, 474 and 476 being axially spaced apart from each other for forming a circumferential groove between adjacent two of them. The groove formed between the first and second circumferential lands 472 and 474 is constantly open to the drain port 464 irrespectively of the axial position of the valve spool 470 within the valve chamber 454, while the groove formed between the second and third circumferential lands 474 and 476 is constantly open to the line pressure outlet port 462 irrespectively of the axial position of the valve spool 470 within the valve chamber 454 and is permitted to be open to the line pressure inlet port 460 depending upon the axial position of the valve spool 470 within the valve chamber 454. The valve spool 470 is, thus, axially movable within the valve chamber 454 between a first axial position providing communication between the line pressure inlet and outlet ports 460 and 462 through the groove between the second and third circumferential lands 474 and 476 as indicated by the right half of the valve spool 470, and a second axial position closing the line pressure inlet port 460 by the second circumferential land 474 is indicated by the left half of the valve spool 470. The valve spool 470 is formed with an axial blind bore open toward the throttle pressure port 458 and is urged to move toward the first axial position thereof by means of a preloaded helical compression spring 478 which is shown seated at one end on an internal end face at the bottom of the above mentioned axial blind bore in the valve spool 470 and at the other end on an annular internal end face of the valve chamber 454 adjacent to the throttle pressure port 458. With the second-third gearshift timing valve 452 thus constructed and arranged, the valve spool 470 is permitted to stay in the first axial position thereof when the force resulting from the governor pressure Pg to be developed in the governor pressure port 456 is overcome by the sum of the force of the spring 478 and the force produced by the throttle pressure Pt to be developed in the throttle pressure port 458. In other words, the valve spool 470 of the gearshift timing valve 452 is held in the first axial position thereof when the vehicle speed at a given instant is relatively low as compared with the opening degree of the carburetor throttle valve at the particular instant with respect to a predetermined relationship between the vehicle speed and the opening degree of the carburetor throttle valve. Such a relationship is dictated by the force of the spring 478 and the ratio between the respective cross sectional areas of the first and third circumferential lands 472 and 474. In the shown arrangement, the first circumferential land 472 of the valve spool 470 is assumed to be smaller in cross sectional area than the third circumferential land 476 which has a cross sectional area substantially equal to that of the second circumferential land 474. As the vehicle speed increases as compared with the opening degree of the carburetor throttle valve and accordingly with the torque output being delivered from the engine, the force resulting from the governor pressure Pg developed in the governor pressure port 456 overcomes the sum of the force of the spring 478 and the force produced by the throttle pressure Pt developed in the throttle pressure port 458 and causes the valve spool 470 to move from the first axial position toward the second axial position thereof, providing communication between the line pressure inlet and outlet ports 460 and 462. Thus, the communication between the line pressure inlet and outlet ports 460 and 462 of the second-third gearshift timing valve 452 is provided when the vehicle speed at a given point of time is at a relatively high level as compared with the opening degree of the carburetor throttle valve at the particular point of time with respect to the above described predetermined relationship between the vehicle speed and the opening degree of the carburetor throttle valve. When communication is provided between the line pressure inlet and outlet ports 460 and 462 of the second-third gearshift timing valve 452, the orifice 468 provided in the high-and-reverse clutch actuating fluid circuit 466 is bypassed by the passageway formed between these ports 460 and 462 so that, if a line pressure fluid is present across this orifice 468, the fluid is permitted to pass through the timing valve 452 without being subjected to the flow restriction by the orifice 468. When the communication between the line pressure inlet and outlet ports 460 and 462 of the gearshift timing valve 452 is blocked, the fluid present across the orifice 468 is caused to flow at a restriction rate therethrough. operated kickdown valve 500 comprising an elongated valve chamber 504 which is formed in the body structure of the transmission control valve assembly. The valve chamber 502 is closed at one axial end and closed at the other and has first, second and third line pressure ports 504, 506 and 508 arranged in this sequence away from the open axial end of the valve chamber 502 as shown. The first line pressure port 504 is in constant communication with the fourth line pressure outlet port 174 of the manually operated gear position selector valve 160 through the previously mentioned fluid passageway 408. The second line pressure port 506 is in constant communication with the above mentioned line pressure ports 292 and 366 of the first-second and second-third gear shift valves 276 and 342, respectively, through the previously mentioned fluid circuit 374 joining the ports 292 and 366, while the third line pressure port 508 of the kickdown valve 500 is in constant communication with the line pressure circuit 130. The valve chamber 502 thus formed has accommodated therewithin a valve spool 510 which is axially slidable in the valve chamber 396. The valve spool 510 is formed with first and second lands 512 and 514 which are axially spaced apart from each other to form therebetween a circumferential groove which is constantly open to the second line pressure port 506 irrespective of the axial position of the valve spool 510 within the valve chamber 502. The valve spool 510 is axially movable within the valve chamber 502 between a first axial position spaced apart from the closed axial end of the valve chamber 502 and a second axial position close to the closed axial end of the valve chamber 502. When the valve spool 510 is in the first axial position thereof, communication is provided between the first and second line pressure ports 504 and 506 through the groove between the lands 512 and 514 of the valve spool 510 and closing the third line pressure port 508 by the second circumferential land 514 as indicated by the right half of the valve spool 510. When the valve spool 510 is in the second axial position, communication is provided between the second and third line pressure ports 508 and 510 through the groove between the lands 512 and 514 of the valve spool 510 and the first line pressure port 504 is closed by the first circumferential land 512 as indicated by the left half of the valve spool 510. The valve spool 510 is urged to move toward the first axial position thereof by means of a preloaded helical compression spring 516 which is shown seated at one end of a wall surface defining the closed axial end of the valve chamber 502 and at the other end on an internal end face formed in the second circumferential land 514 of the valve spool 510. The valve spool 510 thus constructed and arranged is connected to an actuating plunger 518 which axially projects out of the transmission control valve body through the open axial end of the valve chamber 502 and which is connected to or integral with a ferromagnetic core of a solenoid unit (not shown) mounted on the transmission case. Though not shown in the drawings, the solenoid unit has a coil connected to a d.c. power source across a normally open switch which is located in conjunction with the accelerator pedal of the vehicle and which is arranged in such a manner as to close when the accelerator pedal is depressed throughout its full distance of stroke, as is well known in the art.

When the switch for the solenoid unit thus arranged is open and as a consequence the solenoid unit remains inoperative, the valve spool 510 of the kickdown valve 500 is held in the first axial position thereof and provides communication between the first and second line pressure ports 504 and 506. If a fluid pressure is developed in the first line pressure port 504, the fluid pressure is passed from the first line pressure port 504 to the second line pressure port 506 and is directed to the line pressure ports 292 and 366 of the first-second and second-third gear shift valves 276 and 342, respectively, through the fluid circuit 374. When the transmission gear shift lever is in the automatic forward drive range position "D", however, the first line pressure port 504 of the kickdown valve 500 is drained off so that there obtains no fluid pressure in each of the line pressure ports 288 and 366 of the first-second and second-third gear shift valves 276 and 342, respectively.

When the automatic forward drive range condition is established, the line pressure Pl is introduced into the third line pressure port 508 as will be described later. If the accelerator pedal is fully depressed during this condition, the solenoid unit for the kickdown valve 500 is energized and causes the valve spool 510 of the valve 500 to move from the first axial position to the second axial position against the force of the spring 518, closing the first line pressure port 504 and providing communication between the second and third line pressure ports 506 and 508 of the kickdown valve 500. The line pressure Pl which has been introduced into the third line pressure port 508 is passed to the second line pressure port 506 and is directed to the first-gear trigger port 292 of the first-second gear shift valve 276 and the control port 366 of the pressure modulator valve 344. The line pressure thus developed in the control port 366 of the pressure modulator valve 344 lends itself to forcibly causing the valve spool 376 of the second-third gear shift valve 342 to stay in or move into the first axial position thereof and is passed through the second throttle pressure relief port 364 of the pressure modulator valve 344 and by way of the passageway 374 to the first-gear holding port 294 of the first-second gear shift valve 276. The line pressure being developed in the first-gear trigger and holding ports 292 and 294 of the first-second gear shift valve 276, the valve spool 302 of the valve 276 is urged to move toward or stay in the first axial position thereof.

Hydraulic Control System—Operation

Throughout the condition in which the engine is in operation delivering power output from the crankshaft thereof, the pressure regulator valve 94 is operative to produce a line pressure P in the line pressure circuit 130 and the line pressure P thus developed in the circuit 130 is distributed to the line pressure inlet port 166 of the manually operated gear position selector valve 160. The line pressure Pl is also supplied through the line pressure circuit 130 to the transmission throttle valve 394, which is therefore operative to produce a throttle pressure Pt in the throttle pressure circuit 446. The throttle pressure Pt thus developed in the throttle pressure circuit 446 is distributed to the throttle pressure port 360 of the second-third gear shift valve 342 and to the throttle pressure inlet port 428 of the pressure modifier valve 424.

The line pressure Pl introduced into the line pressure inlet port 166 of the manually operated gear position selector valve 160 is selectively distributed through any one or ones of the line pressure outlet ports 168, 170, 172, 174, 176 and 178 of the selector valve any one or ones of the fluid chambers for the clutches 40 and 42 and the brake 68 and the brake-apply and brake-release fluid chambers 76 and 76' of the band servo unit 74 depending upon the axial position selected of the valve spool 192 of the gear position selector valve 160. As previously described in detail, the valve spool 192 of the gear position selector valve 160 of the hydraulic control system embodying the present invention is adapted to provide communication between the line pressure inlet port 166 and each of the first, second, third, fourth, fifth and sixth line pressure outlet ports 168, 170, 172, 174, 176 and 178 of the valve 160 in accordance with the schedules which are indicated in Table 2 below.

TABLE 2

| Gear Positions | Port 168 | Port 170 | Port 172 | Port 174 | Port 176 | Port 178 |
|---|---|---|---|---|---|---|
| "P" | x | x | x | o | o | x |
| "R" | x | x | x | o | o | o |
| "N" | x | x | x | o | o | x |
| "D" | o | o | o | x | x | x |
| "2" | x | o | o | x | x | x |
| "1" | x | x | o | o | o | x |

In Table 2, the sign "o" indicates that the line pressure outlet port in question is in a condition communicating with the line pressure inlet port 166 so that a line pressure Pl is developed in the particular line pressure outlet port, while the sign "x" indicates that the line pressure outlet port in question is in a condition isolated from the line pressure inlet port 166 by any one or ones of the yoke 194 and the circumferential lands 196, 198, 200 and 202 of the valve spool 192 and drained off through any one or ones of the drain ports 184, 186 and 188.

Under a condition in which the valve spool 192 of the manually operated gear position selector valve 160 is in the neutral gear position "N" as shown in FIG. 2, the first, second, third and sixth line pressure outlet ports 168, 170, 172 and 178 are drained off and the fourth and fifth line pressure outlet ports 174 and 176 are permitted to be open to the line pressure inlet port 166 of the gear position selector valve 160. The line pressure Pl thus appearing at the fourth line pressure outlet port 174 is directed through the fluid passageway 408 to the second line pressure port 402 of the throttle back-up valve 396 and causes the throttle back-up valve to develop a throttle back-up pressure in the port 404 thereof as previously described. The throttle back-up pressure is passed to the transmission throttle valve 394, which is therefore caused to deliver the throttle back-up pressure in the throttle pressure circuit 446. The line pressure developed in the fluid passageway 408 is further directed through the kickdown valve 500 to the first-gear trigger port 292 of the first-second gear shift valve 276 and the control port 366 of the pressure modulator valve 344 through the fluid circuit 374. The line pressure developed in the first-gear trigger port 292 of the first-second gear shift valve 276 causes the valve spool 302 of the valve 276 to move into the first axial position thereof if the value happens to be in the second axial position thereof. The line pressure developed in the control port 366 of the pressure modulator valve 344 acts, in cooperation with the force of the spring 392, on the valve spool 376 of the second-third gear shift valve 342 and the valve plunger 386 of the pressure modulator valve 344 so that the valve spool and plunger 376 and 386 are forced to be spaced apart from each other and are held in the respective first axial positions thereof. The valve plunger 386 of the pressure modulator valve 344 being held in the limit axial position thereof, communication is provided between the control port 366 and the second throttle pressure relief port 364 of the modulator valve 344 so that the line pressure developed in the control port 366 is passed through the fluid passageway 375 to the first-gear holding port 294 of the first-second gear shift valve 276 having the valve spool 302 held in the first axial position thereof as above described and holds the valve spool 302 in the first axial position thereof. Thus, the first-second and second-third gear shift valves 276 and 342 are maintained in the respective first and second gear ratio conditions thereof when the transmission gear shift lever is in the neutral gear position "N".

On the other hand, the line pressure Pl appearing in the fifth line pressure outlet port 176 of the manually operated gear position selector valve 160 is directed through the fluid passageway 298 to the first line pressure inlet port 282 of the first-second gear shift valve 276 and imparts an additional force urging the valve spool 302 to stay in the first axial position thereof.

With the first, second, third and sixth line pressure outlet ports 168, 170, 172 and 178 of the manually operated gear position selector valve 160 drained off as above mentioned, there is no fluid pressure developed in the fluid chambers for the clutches 40 and 42 and the brake 68 and the brake-apply and brake-release fluid chambers 76 and 76' of the band servo unit 74 so that all the frictional units of the transmission mechanism shown in FIG. 1 are held inoperative and, as a consequence, the driving torque being delivered from the turbine runner 18 of the torque converter 14 to the transmission input shaft 28 is not permitted to reach the transmission output shaft 64. Under these conditions, vehicle is held at a standstill with the engine operating at idle.

When, now, the transmission gear shift lever is manually moved from the neutral gear position "N" to the automatic forward drive range position "D" thereof, the valve spool 192 of the manually operated gear position selector valve 160 is moved into the corresponding position providing communication between the line pressure inlet port 166 and each of the first, second and third line pressure outlet ports 168, 170 and 172 and holding the fourth and fifth line pressure outlet ports 174 and 176 isolated from the line pressure inlet port 166 and drained off through the second drain port 186 of the gear position selector valve 160. The fourth and fifth line pressure outlet ports 174 and 176 of the gear position selector valve 160 being drained, there is now a fluid pressure developed in the first line pressure inlet port 282 and the first gear trigger port 292 of the first-second gear shift valve 276, the control port 366 of the pressure modulator valve 344 and accordingly the first-gear holding port 294 of the first-second gear shift valve 276. In the absence of a fluid pressure in the second line pressure port 402 of the throttle back-up valve 396, there is no throttle back-up pressure developed in the port 404 of the valve 396 so that the valve spool 410 is allowed to move back into the previously mentioned extreme axial position thereof by the force of the spring 418 and provides communication between the throttle back-up pressure port 404 and the drain port 406 thereof. Under these conditions, the transmission throttle valve 394 is enabled to develop a throttle pressure Pt in the throttle pressure circuit 446.

The third line pressure outlet port 172 of the manually operated gear position selector valve 160 being now held in communication with the line pressure inlet port 166 of the selector valve 160, the line pressure Pl developed in the line pressure circuit 130 is passed through the forward drive clutch actuating fluid circuit 204 to the fluid chamber for the forward drive clutch 42 and causes the clutch 42 to couple. The driving torque which has been delivered from the torque converter 14 to the transmission input shaft 28 is transmitted via the first and second planateary gear assemblies 52 and 54 to the transmission output shaft 64 with the one-way clutch 70 held in play in the power transmission mechanism shown in FIG. 1, thereby producing in the transmission mechanism the first or "low" gear ratio ($D_1$) in the automatic forward drive range "D".

The line pressure Pl developed in the forward drive clutch actuating circuit 204 is also directed to the fluid inlet port 258 of the secondary governor valve 86' of the transmission governor assembly 84, which is accordingly made operative to produce in the governor pressure circuit 274 a governor pressure Pg which is continuously variable with vehicle speed. The governor pressure Pg in the circuit 274 is distributed to the respective governor pressure ports 280 and 348 of the first-second and second-third gear shift valves 276 and 342 and urges the respective valve spools 302 and 376 of the gear shift valves 276 and 342 to move away from the first axial positions thereof. The governor pressure Pg is further directed through the circuit 274 to the governor pressure port 432 of the pressure modifier valve 424 and urges the valve spool 438 of the modifier valves 424 to move away from the first axial position thereof against the force of the spring 444 and the force produced by the throttle pressure Pt acting on the differential pressure acting area between the first and second circumferential lands 440 and 442 of the valve spool 438. The valve spool 438 of the pressure modifier valve 424 is therefore conditioned to stay in an equilibrium axial position between the first and second axial positions thereof as previously described and develops a modified throttle pressure in the modified pressure outlet port 430 thereof. The modified throttle pressure is directed through the fluid passageway 436 to the modified throttle pressure port 108 of the pressure regulator valve 94 and lessens the line pressure Pl depending upon the predetermined relationship between the vehicle speed and the opening degree of the carburetor throttle valve.

When the manually operated gear position selector valve 160 is in the automatic forward drive range position "D", not only the third line pressure outlet port 172 but also the first and second line pressure outlet ports 168 and 170 of the selector valve 160 are permitted to communicate with the line pressure inlet port 166 of the valve 160 so that the line pressure Pl developed in the line pressure circuit 130 is distributed through the passageways 331 and 329 to the control port 320 and the second line pressure inlet port 324 of the second-gear position lock valve 316 and further through the passageway 372 and the one-way orifice check valve 373 to the second line pressure port 352 and second-gear holding port 354 of the second-third gear shift valve 342. The line pressure developed in the control port 320 of the second-gear lock valve 316 is effective, in cooperation with the force of the spring 340, for holding the valve spool 332 of the lock valve 316 to stay in the first axial position thereof isolating the second line pressure inlet port 324 from the line pressure outlet port 326 of the lock valve 316 against the force resulting from the line pressure acting on the differential pressure acting area between the second and third circumferential lands 336 and 338 of the valve 316 from the line pressure port 324. The line pressure developed in the second-gear holding port 354 of the second-third gear shift valve 342 acts on the differential pressure acting between the second and third circumferential lands 380 and 382 of the valve spool 376 held in the first axial position thereof and urges the valve spool 376 to stay in situ against the force produced by the governor pressure Pg acting on the first circumferential land 378 of the valve spool 376. The force thus produced by the governor pressure Pg in the second-third gear shift valve 342 is opposed not only by the force resulting from the line pressure acting on the differential area between the lands 380 and 382 of the valve spool 376 but by the force of the spring 392 and the force produced by the modulated throttle pressure developed between the valve spool 376 of the gear shift valve 342 and the valve plunger 386 of the pressure modulator valve 344 with the control port 366 of the pressure modulator valve 344 drained off through the fluid passageway 375 and the fluid passageway 408 leading from the fourth line pressure outlet port 174 of the manually operated gear position selector valve 160. The modulated throttle pressure developed in the pressure modulator valve 344 is directed through the second throttle pressure relief port 364 of the modulator valve 344 to the second-gear holding part 294 of the first-second gear shift valve 276 having the valve spool 302 in the first axial position thereof as previously described and reinforces the force of the spring 314 urging the valve spool 302 to stay in the first axial position thereof. The line pressure developed in the forward drive clutch actuating circuit 204 is also directed to the second line pressure inlet port 286 of the first-second gear shift valve 276.

As the vehicle speed is increased and exceeds a predetermined value, the force exerted on the valve spool 302 of the first-second gear shift valve 276 by the governor pressure Pg developed in the governor pressure port 280 of the gear shift 276 overcomes the sum of the force of the spring 314 and the force produced by the modulated throttle pressure acting on the differential pressure acting area between the first and second circumferential lands 304 and 306 of the valve spool 302 and causes the valve spool 302 to move away from the first axial position thereof. At an instant when the valve spool 302 thus moving toward the second axial position thereof is moved past an axial position closing the first-gear holding port 294, the force resulting from the modulated throttle pressure acting on the differential pressure acting area between the lands 304 and 306 is eliminated and as a consequence the force resulting from the governor pressure Pg acting on the valve spool 302 is opposed only by the force of the spring 314. Upon reaching the above mentioned axial position, therefore, the valve spool 302 is allowed to move fast into the second axial position thereof. Communication is now provided between the second line pressure inlet and outlet ports 286 and 288 of the first-second gear shift valve 276 so that the line pressure which has been directed to the second line pressure inlet port 286 is passed through the second line pressure outlet port 288 of the gear shift valve 276 to the first line pressure inlet port 322 of the second-gear position lock valve 316. The second-gear position lock valve 316 is maintained in a condition having the valve spool 322 in the first axial position partly by the force of the spring 340 and partly by the force exerted on the valve spool 332 by the line pressure directed to the control port 320 of the valve 316 from the first line pressure outlet port 168 of the manually operated gear position selector valve 160 as previously noted. Communication being thus established between the first line pressure inlet port 322 and the line pressure outlet port 326 of the second-gear position lock valve 316, the line pressure developed in the first line pressure inlet port 322 of the valve 316 is passed through the line pressure outlet port 326 of the valve 316 to the band actuating fluid circuit 330 and by way of the fluid circuit 330 to the brake-apply fluid chamber 76 of the band servo unit 74. The brake band 72 being now applied with the forward drive clutch 42 kept coupled, a shift is made in the transmission mechanism shown in FIG. 1 from the first gear ratio ($D_1$) to the second gear ratio ($D_2$) in the automatic forward drive range "D"

As the vehicle speed is further increased and reaches a level at which the force exerted on the valve spool 376 of the second-third gear shift valve 342 by the governor pressure Pg acting on the valve spool 376 overcomes the sum of the force of the spring 392, the force resulting from the modulated throttle pressure obtaining between the valve spool 376 and the valve plunger 386 of the pressure modulator valve 344 and the force resulting from the line pressure acting on the differential pressure acting area between the lands 380 and 382 of the valve spool 376 from the second-gear holding port 354 of the second-third gear shift valve 342, the valve spool 376 of the gear shift valve 342 is caused to move away from the first axial position thereof. At an instant the valve spool 376 thus moving toward the second axial position thereof reaches an axial position closing the second-gear holding port 354 by the second circumferential land 380 thereof, the valve spool 376 is liberated from the force which has been exerted thereon by the line pressure in the second-gear holding port 354 and is allowed to move fast into the second axial position thereof against the force of the spring 392 and the force resulting from the modulated throttle pressure acting on the valve spool 376. Communication is now provided between the second line pressure inlet port 352 and the line pressure outlet port 356 of the second-third gear shift valve 342 and allow the line pressure to flow from the second line pressure inlet port 352 to the line pressure outlet port 356 of the gear shift valve 342 and through the port 356 to the band releasing fluid circuit 370 leading to the brake-release fluid chamber 76' of the band servo unit 74. Since, in this instance, the line pressure fluid to be admitted to the second line pressure inlet port 352 is subjected to a flow restriction in the one-way orifice check valve 373 provided in the fluid passageway 372 branched from the fluid passageway 331 leading from the first line pressure outlet port 168 of the manually operated gear position selector valve 160, the fluid in the passageway 372 is allowed to flow at a restricted rate into the second line pressure inlet port 352 of the second-third gear shift valve 342. In the brake-release fluid chamber 76' of the band servo unit 74 is therefore developed a fluid pressure which increases at a relatively low, limited rate at an incipient stage and thereafter at an exponentially increasing rate toward the level of the line pressure Pl with the result that the brake band 72 which has been maintained in the applied condition is caused to release initially at a relatively low, limited rate and thereafter at an exponentially increasing rate until the band 72 is fully released. The fluid pressure thus developed in the band releasing fluid circuit 370 is also directed to the line pressure inlet port 442 of the second-third gearshift timing valve 452. If, in this instance, the vehicle speed being produced is low as compared with the opening degree of the carburetor throttle valve with respect to the previously mentioned predetermined relationship between the vehicle speed and the carburetor throttle valve opening degree, the force being exerted on the valve spool 470 of the second-third gearshift timing valve 542 by the governor pressure Pg in the port 456 of the timing valve 452 is overcome by the sum of the force of the spring 478 and the force being exerted on the valve spool 470 by the throttle pressure Pt and allows the valve spool 470 to stay in the first axial position thereof providing communication between the line pressure inlet and outlet ports 460 and 462 of the timing valve 452. Under these conditions, the fluid pressure developed in the band releasing fluid circuit 370 is passed through the line pressure inlet and outlet ports 442 and 444 of the second-third gearshift timing valve 452 to the high-and-reverse clutch actuating fluid circuit 466. The fluid pressure to be passed to the high-and-reverse clutch actuating fluid circuit 466 being thus permitted to bypass the orifice 468 provided in the circuit 466, the fluid to be directed to the fluid chamber of the high-and-reverse clutch 40 is not subjected to the flow restriction due to the orifice 468 so that the high-and-reverse clutch 40 is enabled to couple at a relatively high rate. If, on the other hand, the vehicle speed being produced when the second-third gear shift valve 342 is brought into the third gear ratio condition is high as compared with the opening degree of the carburetor throttle valve with respect to the above mentioned predetermined relationship between these two parameters, the valve spool 470 of the second-third gearshift timing valve 452 is moved into the second axial position thereof and maintains the line pressure inlet port 460 of the timing valve 452 closed by the second circumferential land 474 thereof. The bypass communication between the line pressure inlet and outlet ports 460 and 462 of the second-third gearshift timing valve 452 being thus blocked, the fluid pressure to be passed from the band releasing fluid circuit 370 to the high-and-reverse clutch actuating fluid circuit 466 is compelled to pass through the orifice 468 in the fluid circuit 466 so that the high-and-reverse clutch 40 is caused to couple initially at a relatively low rate and thereafter at an exponentially increasing rate. The brake band 72 being released and the high-and-reverse clutch 40 being thus coupled with the forward drive clutch 42 still maintained in the coupled condition, there is produced in the transmission mechanism shown in FIG. 1 an upshift from the second gear ration ($D_2$) to the third gear ratio ($D_2$) in the automatic forward drive range "D". Thus, the second-third gearshift timing valve 434 lends itself to alleviating snocks to be produced when an upshift is to be made between the second and third gear ratios in the transmission mechanism under conditions in which the vehicle speed is relatively high in comparison with the driving torque being delivered from the engine.

When the second-third gear shift valve 342 is in the third gear ratio condition, the valve spool 376 of the gear shift valve 342 is held in the second axial position thereof and accordingly the valve plunger 386 of the pressure modulator valve 344 is held in the previously mentioned limit axial position thereof as indicated by the upper halves of the valve spool and plunger 376 and 386. Under these conditions, the valve spool 376 of the second-third gear shift valve 342 is subjected only to the force produced by the governor pressure Pt in the governor pressure port 348 of the gear shift valve 342 and the force transmitted to the valve spool 376 from the pressure modulator valve plunger 386 which is acted upon by the throttle pressure Pt in the throttle pressure port 360 of the pressure modulator valve 344. If the vehicle speed is reduced and/or the accelerator pedal is depressed to increase the opening degree of the carburetor throttle valve so that the previously described second predetermined relationship is established between these parameters under these conditions, the force produced by the throttle pressure Pt acting on the valve plunger 386 of the pressure modulator valve 344 overcomes the force produced by the governor pressure Pg acting on the valve spool 376 of the second-third gear shift valve 342 and causes the valve spool 376 to move toward the first axial position thereof. At a point of time when the valve spool 376 thus moving toward the first axial position thereof reaches an axial position in which the groove between the first and second circumferential lands 378 and 380 of the valve spool 376 is open to the second-gear holding port 354 of the gear shift valve 342, the valve spool 376 is subjected to an additional force produced by the line pressure acting on the differential pressure acting area between these lands 378 and 380 and is caused to move fast into the first axial position thereof, isolating the line pressure outlet port 356 from the second line pressure inlet port 352 and permitting the former to be open to the first line pressure inlet port 350. When the manually operated gear position selector valve 160 is in the automatic forward drive range position "D", the sixth line pressure outlet port 178 of the selector valve 160 is drained off through the third drain port 188 of the selector valve 160 so that the first line pressure inlet port 350 of the second-third gear shift valve 342 is drained off through the fluid circuit 206 and the sixth line pressure outlet port 178 of the gear position selector valve 160. When communication is provided between the first line pressure inlet port 350 and the line pressure outlet port 356 of the second-third gear shift valve 342 as above described, the line pressure which has been developed in the brake-release fluid chamber 76' of the band servo unit 74 is discharged through the band releasing fluid circuit 370, the ports 356 and 350 of the second-third gear shift valve 342, the fluid circuit 206 and the sixth line pressure outlet port 178 of the manually operated gear position selector valve 160. Under the conditions in which the previously described second predetermined relationship is established between the vehicle speed and the opening degree of the carburetor throttle valve, the force being exerted on the valve spool 470 of the first-second gearshift timing valve 452 by the governor pressure Pg acting on the valve spool 470 is overcome by the sum of the force of the spring 478 and the force resulting from the throttle pressure Pt acting on the valve spool 470, which is accordingly held in the first axial position thereof providing communication between the line pressure inlet and outlet ports 460 and 462 of the gearshift timing valve 452. The fluid pressure which has been developed in the fluid chamber of the high-and-reverse clutch 40 is therefore allowed to bypass the orifice 468 in the high-and-reverse clutch actuating fluid passageway 466 through the line pressure outlet and inlet ports 462 and 460 of the second-third gearshift timing valve 452 and thereby enables the high-and-reverse clutch 40 to uncouple at a relatively high rate. The fluid pressure being discharged from each of the brake-release fluid chamber 76' of the band servo unit 74 and the fluid chamber of the high-and-reverse clutch 40, the brake band 72 is applied for a second time and the high-and-reverse clutch 40 is uncoupled. With the forward drive clutch 42 kept coupled, a shift is now made in the transmission mechanism from the third gear ratio ($D_3$) to the second gear ratio ($D_2$) in the automatic forward drive range "D". When the second-third gear shift valve 342 restores the second gear ratio condition thereof, a modulated throttle pressure is developed in the pressure modulator valve 344.

If the vehicle further slows down and as a consequence the vehicle speed is reduced to a predetermined value, the force exerted on the valve spool 302 of the first-second gear shift valve 276 by the governor pressure Pg in the governor pressure port 280 of the gear shift valve 276 is overcome by the force of the spring 314 with the result that the valve spool 302 is caused to move from the second axial position back into the first axial position thereof. In the course of movement from the second axial position to the first axial position of the valve spool 302, the first circumferential land 304 of the valve spool 302 opens up the first-gear holding port 294 of the gear shift valve 276 so that the valve spool 302 is moved fast into the first axial position thereafter by an additional force resulting from the modulated throttle pressure acting on the differential pressure acting area between the first and second circumferential lands 304 and 306 of the valve spool 302 from the first-gear holding port 294 of the valve 276. With the valve spool 302 of the first-second gear shift valve 276 thus returned to the first axial position thereof, the second line pressure outlet port 288 of the gear shift valve 276 is isolated from the second line pressure port 286 and permitted to be open to the drain port 296 of the valve 276. The line pressure which has been developed in the brake-apply fluid chamber 76 of the band servo unit 74 is now discharged through the band actuating fluid circuit 330, past the line pressure outlet port 326 and the first line pressure inlet port 322 of the second-gear position lock valve 316 and by way of the fluid passageway 328 and the second line pressure outlet port 288 and the drain port 296 of the first-second gear shift valve 276. The brake band 72 being thus released, only the forward drive clutch 42 remains operative in the transmission mechanism shown in FIG. 1 and, in cooperation with the one-way clutch 70, produces in the transmission mechanism shown in FIG. 1 the first gear ratio ($D_1$) in the automatic forward drive range "D".

By manipulating the transmission gear shift lever into the manual second forward drive range position "2", the manually operated gear position selector valve 160 is moved to the corresponding axial position providing communication from the line pressure inlet port 166 to the second, third and fourth line pressure outlet ports 170, 172 and 174 of the selector valve 160 and causing the first line pressure outlet port 168 to be drained off through the first drain port 184 of the valve 160. The first line pressure outlet port 168 of the gear position selector valve 160 being drained off, there is no fluid pressure developed in the control port 320 of the second-gear position lock valve 316, which is accordingly held in a condition having the valve spool 332 maintained in the second axial position by the force resulting the line pressure acting on the differential pressure acting area between the second and third circumferential lands 336 and 338 of the valve spool 332 against the force of the spring 340. In the second-gear position lock valve 316 is now provided communication between the second line pressure port 324 and the line pressure outlet port 326 so that the line pressure developed in the second line pressure outlet port 170 of the gear position selector valve 160 is directed through the fluid passageway 329, past the line pressure inlet and outlet ports 324 and 326 of the second-gear position lock valve 316 and by way of the band actuating fluid circuit 330 to the brake-apply fluid chamber 76' of the band servo unit 74. The brake band 72 being applied in addition to the forward drive clutch 42 which is maintained in the coupled condition with the third line pressure outlet port 172 of the gear position selector valve 160 held in communication with the line pressure inlet port 166 of the selector valve 160, the second gear ratio is established in the transmission mechanism shown in FIG. 1. Under the condition in which the second gear ratio in the manual second forward drive range "2" is thus established, there is a line pressure developed in the fourth line pressure outlet port 174 of the gear position selector valve 160. The line pressure in the port 174 of the gear position selector valve 160 is directed through the fluid passageway 408 to the second line pressure port 402 of the throttle back-up valve 396, which is as a consequence conditioned to develop in the port 404 thereof a throttle back-up pressure higher than the throttle pressure Pt normally produced by the transmission throttle valve 394. The throttle back-up pressure is passed to the transmission throttle valve 394 and through the throttle valve 394 and the throttle pressure circuit 446 to the throttle pressure port 148 of the line pressure booster valve 146 and maintains the line pressure Pl at an increased level throughout the manual second forward drive range condition. The line pressure passed to the fluid passageway 408 from the fourth line pressure outlet port 174 of the manually operated gear position selector valve 160 is further directed through the kickdown valve 500 and the fluid circuit 374 to the first-gear trigger port 292 of the first-second gear shift valve 276 and to the control port 366 of the pressure modulator valve 344. If, in this instance, the valve spool 302 of the first-second gear shift valve 276 happens to be in the second axial position thereof, the line pressure developed in the first-gear trigger port 292 of the gear shift valve 276 acts on the differential pressure acting area between the first and second circumferential lands 304 and 306 of the valve spool 302, which is as a consequence forcibly moved into the first axial position thereof. On the other hand, the line pressure developed in the control port 366 of the pressure modulator valve 344 acts on the valve spool 376 of the second-third gear shift valve 342 and the valve plunger 386 of the pressure modulator valve 344 and causes the valve spool and plunger 376 and 386 to move into or stay in their respective first axial positions. The valve plunger 386 of the pressure modulator valve 344 being thus held in the first axial position thereof, communication is established between the control port 366 and the second throttle pressure relief port 364 of the modulator valve 342 so that the line pressure introduced into the control port 366 is further passed through the second throttle pressure relief port 364 of the valve 344 and through the passageway 374 to the first-gear holding port 294 of the first-second gear shift valve 276 having the valve spool 302 maintained in the first axial position or moved into the first axial position thereof by the line pressure developed in the first-gear trigger port 292 as above described. The line pressure developed in the first-gear holding port 294 of the first-second gear shift valve 276 thus acts on the differential pressure acting area between the first and second circumferential lands 304 and 306 of the valve spool 302, which is therefore maintained in the first axial position thereof. When the transmission gear shift lever is in the manual second forward drive range position "2", both of the first-second and second-third gear shift valves 276 and 342 are maintained in their respective first and second gear ratio conditions without respect to the governor pressure Pg in the respective governor pressure ports 280 and 348 of the gear shift valves 276 and 342 or, in other words, independently of the road speed of the vehicle.

If the transmission gear shift lever is moved to the manual first forward drive range position "1" under these conditions, the manually operated gear position selector valve 160 is moved into the corresponding axial position causing the second line pressure outlet port 170 as well as the first line pressure outlet port 168 to be drained off through the first drain port 184 and permitting not only the third and fourth line pressure outlet ports 172 and 174 but the fifth line pressure outlet port 176 to communicate with the line pressure inlet port 176 of the gear position selector valve 160. The second line pressure outlet port 170 of the gear position selector valve 160 being drained off, the line pressure which has been developed in the second line pressure inlet port 324 of the second-gear position lock valve 316 is discharged through the passageway 329 and the ports 170 and 184 of the gear position selector valve 160. The valve spool 332 of the second-gear position lock valve 316 is therefore released from the line pressure which has been acting on the differential pressure acting area between the lands 336 and 338 of the valve spool 332 and is allowed to restore the first axial position thereof by the force of the spring 340, providing communication between the first line pressure inlet port 322 and the line pressure outlet port 326 of the valve 316. The line pressure which has been developed in the brake-apply fluid chamber 76 of the band servo unit 74 is now discharged through the band actuating fluid passageway 330, the ports 326 and 322 of the second-gear position lock valve 316, the passageway 328, and the second line pressure outlet port 288 and the drain port 308 of the first-second gear shift valve 276 which is held in the first gear ratio condition having the valve spool 302 in the first axial position providing communication between the ports 288 and 308. The line pressure having been discharged from the brake-apply fluid chamber 76 of the band servo unit 74, the brake band 72 is released and makes the transmission mechanism ready to produce the first gear ratio condition therein. The fourth line pressure outlet port 174 of the manually operated gear position selector valve 160 being kept open to the line pressure inlet port 166, the line pressure developed in the first-gear trigger and holding ports 292 and 294 of the first-second gear shift valve 276 and the control port 366 and the throttle pressure relief ports 362 and 364 of the second-third gear shift valve 342 is maintained.

Under the manual first forward drive range condition, the line pressure is developed in the fifth line pressure outlet port 176 in addition to the third and fourth line pressure outlet ports 172 and 174 of the manually operated gear position selector valve 160 and is directed through the passageway 298 to the first line pressure inlet port 282 of the first-second gear shift valve 276. The valve spool 302 of the first-second gear shift valve 276 being held in the first axial position thereof, communication is established between the first line pressure inlet and outlet ports 282 and 284 of the first-second gear shift valve 276 so that the line pressure developed in the first line pressure inlet port 282 is directed on the one hand into the line pressure feedback port 290 of the gear shift valve 276 and on the other hand through the low-and-reverse brake actuating fluid circuit 300 to the first line pressure inlet port 400 of the throttle back-up valve 396 and to the fluid chamber of the low-and-reverse brake 68. The line pressure developed in the line pressure feedback port 290 of the first-second gear shift valve 276 acts on the valve spool 302 of the valve 276 and holds the valve spool in the first axial position thereof so as to maintain the communication between the first line pressure inlet and outlet ports 282 and 284 of the first-second gear shift valve 276. The force thus urging the valve spool 302 of the first-second gear shift valve 276 to stay in the first axial position thereof by the line pressure developed in the line pressure feedback port 290 of the gear shift valve 276 is reinforced by the force of the spring 314, the line pressure acting on the differential pressure acting area between the first and second circumferential lands 304 and 306 of the valve spool 302 from the first-gear holding port 294 and the line pressure acting on the differential pressure acting area between the fourth and fifth circumferential lands 310 and 312 of the valve spool 302 from the second line pressure inlet port 286 of the first-second gear shift valve 276, which is thus maintained in the first gear ratio condition without respect to the governor pressure Pg in the governor pressure port 280 of the valve 276 or, in other words, independently of the vehicle speed. On the other hand, the line pressure developed in the first line pressure inlet port 400 of the throttle back-up valve 396 is admitted into one end portion of the valve chamber 398 of the throttle back-up valve 396 through the previously mentioned radial and axial passageways formed in the valve spool 410 and acts on the outer axial end of the first circumferential land 412 of the valve spool 410. The result is that the valve spool 410 which has been held in the previously mentioned equilibrium axial position producing the throttle back-up pressure in the port 404 is forcibly moved into the second axial position thereof against the force of the spring 418 and initially further against the force produced by the fluid pressure acting on the differential pressure acting area between the second and third circumferential lands 414 and 416 of the valve spool 410. The throttle back-up pressure port 404 of the valve 396 is now isolated from the second line pressure port 402 and is made open to the drain port 406 of the valve 396 and, at the same time, the radial port formed in the valve spool 410 is brought into communication with the second line pressure inlet port 402. The line pressure in the second line pressure inlet port 402 of the throttle back-up valve 396 being maintained with the fourth line pressure outlet port 174 of the manually operated gear position selector valve 160 kept open to the line pressure inlet port 166 of the gear position selector valve 160, the valve spool 410 of the throttle back-up valve 396 is enabled to stay in the second axial position thereof by the line pressure developed in the second line pressure inlet port 402 of the valve 396 as indicated by the right half of the valve spool 410. The line pressure developed in the fluid chamber of the low-and-reverse brake 68 causes the brake 68 to apply and produce the first forward drive gear ratio in the transmission mechanism in cooperation with the forward drive clutch 42 which is maintained in the coupled condition. In contrast to the condition in which the first gear ratio ($D_1$) in the automatic forward drive range "D" is produced by the combination of the forward drive clutch 42 and the one-way clutch 70 (FIG. 1), the first gear ratio condition in the manual first forward drive range "1" is produced by the combination of the forward drive clutch 42 and the low-and-reverse brake 68 as above described so that the transmission mechanism is permitted to transmit therethrough a driving torque from the transmission output shaft backwardly to the transmission input shaft when the engine is to be braked upon by the vehicle inertia.

When, now, the transmission gear shift lever is moved from the neutral gear position "N" to the reverse drive gear position "R", the first, second and third line pressure outlet ports 168, 170 and 172 of the manually operated gear position selector valve 160 are drained off through the first drain port 184 of the selector valve 160 and, at the same time, the fourth, fifth and sixth line pressure outlet ports 174, 176 and 178 of the gear position selector valve 160 are permitted to be in communication with the line pressure inlet port 166 of the gear position selector valve 160. With the third line pressure outlet port 174 of the gear position selector valve 160 drained off, there is no fluid pressure developed in the forward drive clutch actuating fluid circuit 204 so that the forward drive clutch 42 is maintained in the uncoupled condition. In the absence of a fluid pressure developed at the fluid inlet port 258 of the secondary governor valve 86′, furthermore, the transmission governor assembly 84 is maintained inoperative to deliver the governor pressure Pg so that there is no force urging the valve spools 302 and 376 of the first-second and second-third gear shift valves 276 and 342 to move away from their respective first axial positions. With the fourth and fifth line pressure ports 174 and 176 brought into play in the manually operated gear position selector valve 160, there is developed a line pressure Pl in each of the first and second line pressure inlet ports 400 and 402 of the throttle back-up valve 396, the control port 366 and the first and second throttle pressure relief ports 362 and 364 of the pressure modulator valve 344, and the first line pressure inlet and outlet ports 282 and 284, the line pressure feedback port 290 and the first-gear trigger and holding ports 292 and 294 of the first-second gear shift valve 276 with the result that the first-second and second-third gear shift valves 276 and 342 are maintained in their respective first and second gear ratio conditions as under the above described manual first forward drive range conditions. The line pressure developed in the fifth line pressure outlet port 176 of the manually operated gear position selector valve 160 is also directed by way of the first line pressure inlet and outlet ports 282 and 284 of the first-second gear shift valve 276 and through the fluid circuit 300 to the fluid chamber of the low-and-reverse brake 68 and causes the brake 68 to apply.

The sixth line pressure inlet port 178 of the manually operated gear position selector valve 160 being open to the line pressure inlet port 166 of the valve 160, the line pressure is directed by way of the fluid circuit 206 to the line pressure port 150 of the line pressure booster value 146 and to the first line pressure inlet port 350 of the second-third gear shift valve 342. The line pressure developed in the line pressure port 150 of the line pressure booster valve 146 acts on the differential pressure acting area between the lands 156 and 158 of the valve sppol 154 and, in cooperation with the throttle pressure Pt acting on the outer end face of the first circumferential land 156 of the valve spool 154, urges the valve spool 154 to move away from the first axial position thereof and accordingly urges the valve spool 114 of the pressure regulator valve 94 to move toward the first axial position thereof, thereby giving rise to an increase in the line pressure Pl being developed by the pressure regulator valve 94. On the other hand, the second-third gear shift valve 342 being maintained in a condition establishing communication between the first line pressure inlet port 350 and the line pressure outlet port 356 of the valve 342 having the valve spool 376 held in the first axial position thereof, the line pressure developed in the first line pressure inlet port 350 of the gear shift valve 342 as above described is passed through the line pressure outlet port 356 of the valve 342 to the band releasing fluid circuit 370. The transmission governor assembly 84 being held inoperative to develope a governor pressure Pg, there is no fluid pressure in the governor pressure port 456 of the second-third gearshift timing valve 452, which is as a consequence maintained in a condition having the valve spool 470 held in the first axial position thereof by the force of the spring 478 and the throttle pressure Pt developed in the port 458, thereby establishing communication between the line pressure inlet and outlet ports 460 and 462 of the gear-shift timing valve 452. The fluid pressure developed in the band releasing fluid circuit 370 is therefore allowed to bypass the orifice 468 through these port 460 and 462 of the second-third gearshift timing valve 452 and is directed at a relatively high rate into the fluid chamber of the high-and-reverse clutch 40.

With both of the high-and-reverse clutch 40 and the low-and-reverse brake 68 put into operation, the respective sun gears 52a and 54a of the first and second planetary gear assemblies 52 and 54 in the transmission mechanism shown in FIG. 1 are driven to rotate in the forward direction and the pinion carrier 60 for the second planetary gear assembly 54 is held locked. The transmission output shaft 64 is driven by the ring gear 54b of the second planetary gear assembly 54 for rotation in the reverse direction about the center axis of the shaft, producing the reverse drive gear condition in the transmission mechanism. The high-and-reverse clutch 40 and the low-and-reverse brake 68 thus actuated are acted upon by the line pressure which is boosted by the line pressure introduced into the line pressure port 150 of the line pressure booster valve 146 as previously described and are accordingly enabled to be maintained in the coupled and applied conditions, respectively, with sufficient forces throughout the reverse drive condition of the vehicle.

Principal Features of The Invention

The improvement according to the present invention consists in the construction and arrangement of the transmission throttle valve 394 which has been only schematically illustrated in FIG. 2A. The transmission throttle valve 394 is responsive to the movement of the accelerator pedal of an automotive vehicle and is operative to produce a fluid pressure, or throttle pressure Pt, which is continuously variable with the opening degree of the carburetor throttle valve and which is thus representative of the amount of load applied to the engine from the accelerator pedal. Description will be hereinafter made in connection with the detailed construction and arrangement of such a transmission throttle valve with reference to FIGS. 3 and 4 of the drawings.

Figure 3:
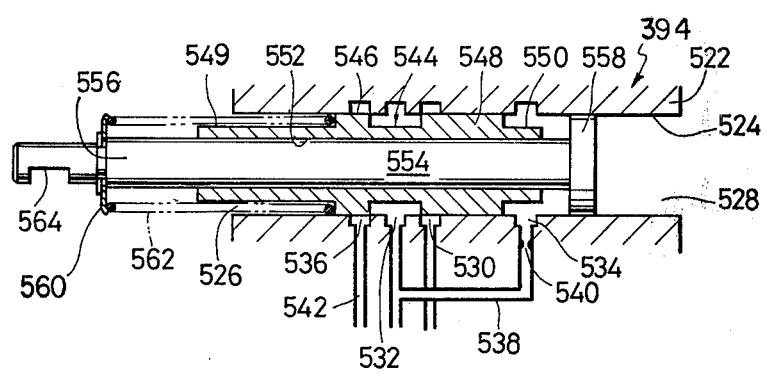
FIGS. 3 and 4 are longitudinal sectional views showing the detailed construction of the transmission throttle valve incorporated in the hydraulic control system illustrated in FIGS. 2A and 2B and held in different operative conditions.

Referring to FIG. 3, the transmission throttle valve 394 provided by the present invention comprises a wall portion 522 which forms part of the body structure of the transmission control valve assembly into which the hydraulic control system described with reference to FIGS. 2A and 2B is incorporated. The wall portion 522 is formed with an elongated bore 524 which is open at the opposite, outer and inner axial ends 526 and 528. The wall portion 522 is further formed with a line pressure port 530, a throttle pressure port 532, a throttle pressure feedback port 534 and a throttle back-up pressure port 536. The line pressure port 530 is open between the throttle pressure port 532 located closer to the open outer axial end 526 of the valve chamber 524 and the throttle pressure feedback port 534 which is located closer to the open inner axial end of the bore 524. The throttle back-up pressure port 536 is open between the throttle pressure port 532 and the open axial end 526 of the bore 524. The throttle pressure port 532 and the throttle pressure feedback port 534 is in constant communication with each other through a feedback passageway 538 having a calibrated orifice 540 incorpprated. As will be better seen from FIGS. 2A and 2B, the throttle pressure port 532 and the throttle pressure feedback port 534 are further in constant communication with the throttle pressure circuit 446. The line pressure port 530 is in constant communication with the line pressure circuit 130. The throttle back-up pressure port 536 is in constant communication with the throttle back-up pressure port 404 of the previously described throttle back-up valve 396 through a passageway.

Through the elongated bore 524 thus formed in the wall portion 522 is axially slidable a valve spool 544 having first and second circumferential lands 546 and 548 which are substantially equal in cross sectional area and which are axially spaced apart from each other so as to form a circumferential groove therebetween. The first and second circumferential lands 546 and 548 are closer to the open axial ends 526 and 528, respectively, of the valve chamber 524. The valve spool 544 further has a first or outer axial extension 549 projecting axially outwardly from the first circumferential land 546 and a second or inner axial extension 550 projecting axially outwardly from the second circumferential land 548 the axial extensions 549 and 550 being smaller in cross sectional area than the lands 546 and 548 of the valve spool 544. The spacing between the first and second circumferential lands 546 and 548 of the valve spool 544 is such that the first circumferential land 546 is on the point of fully closing the throttle back-up pressure port 536 when the second circumferential land 548 is on the point of opening up the line pressure port 530 and that the second circumferential land 548 is on the point of fully closing the line pressure port 530 when the first circumferential land 546 is on the point of opening up the throttle back-up pressure port 536, as will be seen from FIGS. 3 and 4. When the valve spool 544 is in an axial position having the lands 546 and 548 thus located with respect to the ports 530 and 536, the inner axial extension 500 of the valve spool 544 is located adjacent the throttle pressure feedback port 534 so that the throttle pressure feedback port 534 is maintained uncovered by the second circumferential land 548 of the valve spool 544 as shown.

The valve spool 544 is formed with an axial bore 522 which is open at both axial ends of the valve spool 544. A valve plunger 554 has a stem portion 556 which is axially slidable through this axial bore 552 in the valve spool 544 and which projects axially from the inner axial end of the bore 552. The valve plunger 554 has formed adjacent the inner axial end of the stem portion 556 a disc-shaped plug portion 558 which is axially slidable in the axial bore 524 in the wall portion 522 and which has a cross sectional area substantially equal to the cross sectional areas of the lands 546 and 548 of the valve spool 544. The valve plunger 554 further has fixedly mounted thereon an annular spring seat element 560 adjacent the outer axial end of the stem portion 556. A helical compression spring 562 is thus seated at one end on the inner end face of the spring seat element 560 and at the other end on the axially outer end face of the first circumferential land 546 of the valve spool 544 so that the valve spool 544 and the valve plunger 554 are urged to axially move relative to each other in a direction in which the valve spool 544 is axially spaced apart from the spring seat element 560. The valve plunger 554 is held in engagement with the accelerator pedal of the vehicle by means of a suitable mechanical linkage. For engagement with such a linkage, the valve plunger 554 has formed in the stem portion 556 an indent 564 adjacent the outer axial end of the stem portion 556.

Figure 4:
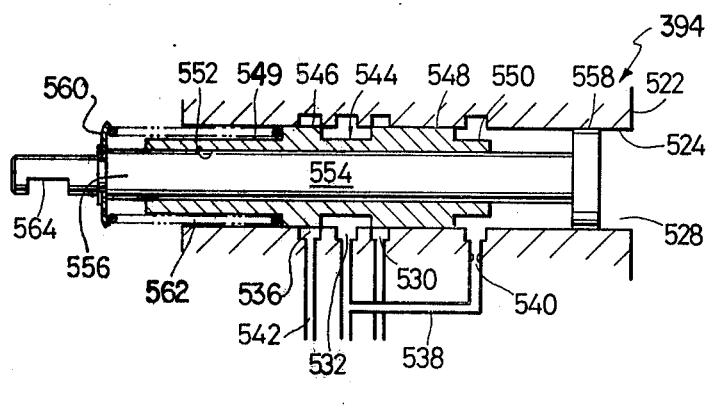
Figure 5:
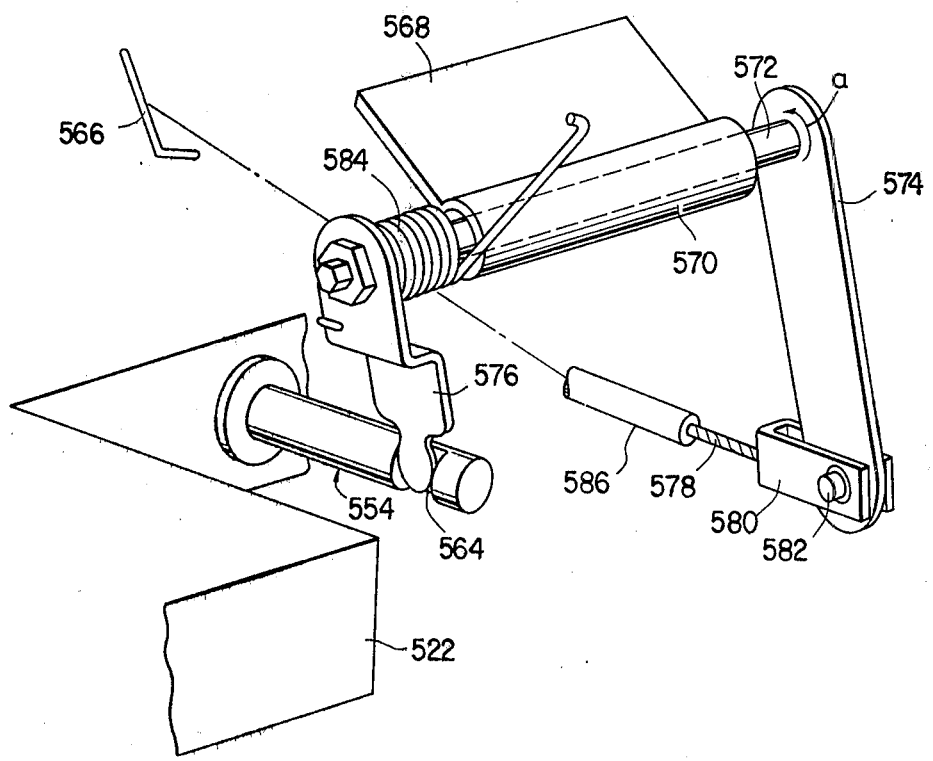
FIG. 5 is a perspective view showing a preferred example of a mechanical linkage through which the transmission throttle valve incorporated into a hydraulic control system according to the present invention is to be connected to or engaged by the accelerator pedal of an automotive vehicle.

Referring to FIG. 5, the mechanical linkage providing engagement between the valve plunger 554 and the accelerator pedal (shown schematically at 566) is shown comprising a stationary support member 568 having a sleeve portion 570 formed with an axial bore which is open at both ends of the sleeve portion 570. The sleeve portion 570 is preferably arranged so that the axial bore formed therein has a center axis which is substantially perpendicular in non-intersecting relationship to the direction in which the valve plunger 554 is axially movable with respect to the stationary wall portion 522. A lever connecting shaft 572 is slidably passed through the axial bore in the sleeve portion 570 of the support member 568 and has opposite axial end portions projecting outwardly from the axial ends of the bore. The lever connecting shaft 572 has fixedly supported thereon a first lever 574 extending substantially perpendicularly from one axial end portion of the shaft 572 and a second lever 576 extending, in part, substantially perpedicularly from the other axial end portion of the shaft 572. A steel wire rope 578 is anchored at one end to the accelerator pedal 566 and at the other end to a bifurcated shackle 580 pivotally connected to a free end portion of the first lever 574 by means of a pin 582. The first lever 574 and accordingly the lever connecting shaft 572 are thus rotatable about the center axis of the shaft 572 as the accelerator pedal 566 is moved between a released position and a fully depressed or kickdown position thereof. On the other hand, the second lever 576 has a generally rounded free end portion received in the above mentioned indent 564 formed in the valve plunger 554 of the transmission throttle valve 394 (FIGS. 3 and 4), the rounded free end portion of the lever 576 having diametrically opposite, curved edges respectively engageable with or constantly engaged by the end faces which the valve plunger 554 has formed at the opposite axial ends of the indent 564. Being thus engaged by the second lever 576, the valve plunger 554 of the transmission throttle valve is axially movable back and forth as the lever 576 is caused to turn about the center axis of the lever connecting shaft 572. The first and second levers 574 and 576 are arranged with respect to each other in such a manner that, when the accelerator pedal 566 is depressed or, more exactly, a distance greater than a predetermined value from the fully released position thereof so as, the first lever 574 and accordingly the second lever 576 are driven by means of the wire rope 578 to turn about the center axis of the lever connecting shaft 572 in a direction to drive the valve plunger 554 of the transmission throttle valve in a direction to retract into the wall portion 522. Then levers 574 and 576 and the lever connecting shaft 572 thus arranged are constantly urged to turn in the opposite direction indicated by an arrow a in FIG. 5, viz., in a direction to move the valve plunger 554 in a direction to axially protrude from the wall portion 522 by suitable biasing means such as, for example, a preloaded helical torsion spring 584 which is anchored at one end on the second lever 576 as shown and at the other end on a suitable stationary member (not shown). The wire rope 578 extending between the accelerator pedal 566 and the shackle 580 on the first lever 574 is kept taut against the biasing force of the torsion spring 584 so that, when the accelerator pedal 566 is held in the released position thereof producing an idling condition in the engine, the first and second levers 574 and 576 are held in such angular positions about the center axis of the lever connecting shaft 572 that the valve plunger 554 engaged by the second lever 576 assumes the idling axial position illustrated in FIG. 3. Thus, when the accelerator pedal 566 is depressed all the way down or, more exactly, a distance greater than a predetermined value from the fully released position thereof so as to produce a kick-down condition, the valve plunger 554 is driven to move into a certain axially inner limit position. By preference, the wire rope 578 may be wrapped in a suitable protective sheath 586 as shown. Though not shown in the draings, the mechanical linkage illustrated in FIG. 5 further comprises stop means which is adapted to prevent the valve plunger 554 of the transmission throttle valve 394 beyond a predetermined limit axial position illustrated in FIG. 3. The limit axial position of the valve plunger 554 corresponds to the fully released position of the accelerator pedal 566 and accordingly to the idling position of the carburetor throttle valve (not shown). As the accelerator pedal 566 is depressed from the fully released position thereof so that the carburetor throttle valve is actuated to open wider, the valve plunger 554 of the transmission throttle valve 394 is driven to move axially inwardly from the limit axial position illustrated in FIG. 3 by means of the mechanical linkage shown in FIG. 5.

The operation of the transmission throttle valve 394 thus constructed and arranged in conjunction with the accelerator pedal 566 will be hereinafter described with reference to FIGS. 2A and 2B.

Under conditions in which the transmission gear shift lever is in any one of the parking gear position "P", reverse drive gear position "R", neutral gear position "N" and manual first forward drive range position "1", there is a line pressure developed in the fourth and fifth line pressure outlet ports 174 and 176 of the manually operated gear position selector valve 160. The line pressure developed in the fourth line pressure outlet port 174 of the gear position selector valve 160 is directed through the passageway 408 to the second line pressure port 402 of the throttle back-up valve 396, while the line pressure developed in the fifth line pressure outlet port 176 of the gear position selector valve 160 is directed through the passageway 298, the first line pressure inlet and outlet ports 282 and 284 of the first-second gear shift valve 276 and the low-and-reverse brake actuating fluid circuit 300 to the first line pressure port 400 of the throttle back-up valve 396 and acts through the radial and axial passageways in the valve spool 410 of the backup valve 396 on the end face of the first circumferential land 412 of the valve spool 410. The valve spool 410 of the throttle back-up valve 396 is therefore held in the second axial position thereof against the force of the spring 418 and provides communication between the throttle back-up pressure port 404 and the drain port 406 as indicated by the right half of the valve spool 410. In the presence of the line pressure also developed in the second line pressure port 402, the valve spool 410 is maintained in the second axial position thereof by the line pressure which is admitted into the radial and axial passageways in the valve spool 410 through the second line pressure port 402. Under conditions in which the transmission gear shift lever is in a position other than the automatic forward drive range position "D" and the manual forward drive range position "2", the throttle back-up pressure port 536 of the transmission throttle valve 394 shown in FIGS. 3 and 4 is thus permited to be open to the transmission oil reservoir 90 (FIG. 2A) through the passageway 542 and the ports 404 and 406 of the throttle back-up valve 396. When, on the other hand, the transmission gear shift lever is in the automatic forward drive range position "D", the fourth and fifth line pressure outlet ports 174 and 176 of the manually operated gear position selector valve 160 are isolated from the line pressure circuit 130 with the result that there is no fluid pressure in the first and second line pressure inlet ports 400 and 402 of the throttle back-up valve 396. Under these conditions, the valve spool 410 of the throttle back-up valve 396 is maintained in the first axial position thereof by the force of the spring 418 and provides communication between the throttle back-up pressure port 404 and the second line pressure port 402 of the throttle back-up valve 396. The throttle back-up pressure port 536 of the transmission throttle valve 394 shown in FIGS. 3 and 4 is therefore permitted to be open to the transmission oil reservoir 90 through the passageway 542, the ports 404 and 402 of the throttle back-up valve 396, the low-and-reverse brake actuating fluid pressure 300, and the fourth line pressure outlet port 174 and the second drain port 186 of the manually operated gear position selector valve 160. Thus, the throttle back-up pressure port 536 of the transmission throttle valve 394 serves as a drain port when the transmission gear shift lever is in any of the positions except for the manual second forward drive range position "2".

If the accelerator pedal 566 of the vehicle is maintained in the fully released position thereof with the transmission gear shift lever held in one of these positions, the mechanical linkage shown in FIG. 5 holds the valve plunger 554 of the transmission throttle valve 394 in the previously mentioned limit axial position thereof as illustrated in FIG. 3. If, in this instance, there is no fluid pressure developed in the transmission throttle valve 394, the spring 562 engaging both of the valve spool 544 and the valve plunger 554 maintains the valve spool 544 in an axial position in which the groove between the first and second circumferential lands 546 and 548 thereof is open to the line pressure port 530. In the presence of a line pressure Pl developed in the line pressure circuit 130, the line pressure is directed into the line pressure port 530 of the transmission throttle valve 394 and is allowed to pass through the groove between the lands 546 and 548 of the valve spool 544 to the throttle pressure port 532 and further through the feedback passageway 538 to the throttle pressure feedback port 534. The line pressure thus developed in the throttle pressure feedback port 534 of the transmission throttle valve 394 enters a space formed between the valve spool 544 and the plug portion 558 of the valve plunger 554 and acts on one end face of the plug portion 558 of the valve spool 554 and on one end face of the second circumferential land 548 and the end face of the second or inner axial extension 550 of the valve spool 544. The valve spool 544 and the valve plunger 554 are consequently urged to axially move in the opposite directions relative to each other and to the wall portion 522 against the force of the spring 562. The valve plunger 554 being held in the limit axial position shown in FIG. 3 by the previously described stop means forming part of the linkage mechanism illustrated in FIG. 5, the plug portion 558 of the valve plunger 554 imparts reaction to the fluid pressure acting thereon so that the valve spool 544 alone is caused to move in a direction in which the lands 546 and 548 thereof are moved away from the plug portion 558 of the valve plunger 554 against the force of the spring 562. When the valve spool 544 thus moved axially outwardly through the bore 524 in the wall portion 522 reaches a certain axial position relative to the wall portion 522, the line pressure port 530 is closed by the second circumferential land 548 of the valve spool 544 and, in turn, there is formed a slight clearance between the throttle pressure port 532 and the throttle back-up pressure port 536 past the inner axial end of the first circumferential land 546 of the valve spool 544. Communication is now provided through such a clearance between the throttle pressure port 532 and the throttle back-up pressure port 536 so that the fluid pressure which has been developed in the throttle pressure port 532 is allowed to be partially discharged through the throttle back-up pressure port 536 which is maintained in a condition drained as previously described. This causes reduction in the fluid pressure in the throttle pressure port 532 and accordingly in the space between the valve spool 544 and the plug portion 558 of the valve plunger 554 with the result that the force urging the valve spool 544 to move axially outwardly is also reduced. The valve spool 544 is therefore moved backwardly by the force of the spring 562 and restores an axial position closing the throttle back-up pressure port 536 by the first circumferential land 546 and providing communication between the line pressure port 530 and the throttle pressure port 532. The valve spool 544 thus attempting to attain a certain equilibrium axial position relative to the wall portion 522, there is developed in the throttle pressure port 532 and the throttle pressure feedback port 534 a fluid pressure which is variable with the force of the spring 562.

When the accelerator pedal 566 is depressed and as a consequence the valve plunger 554 is forced to move axially inwardly relative to the wall portion 522 as shown in FIG. 4, the helical compression spring 562 acting on the valve spool 544 and the valve plunger 554 is compressed and accordingly the force of the spring 562 urging the valve spool 544 to move axially inwardly relative to the wall portion 522 increases as the accelerator pedal 566 is depressed. The increased force thus exerted on the valve spool 544 by the spring 562 is opposed by the fluid pressure acting on the end faces of the second circumferential land 548 and the second or inner axial extension 550 of the valve spool 544 so that the fluid pressure in the space between the valve spool 544 and the plug portion 558 of the valve plunger 554 increases as the valve plunger 554 is moved depper through the bore 524 in the wall portion 522. The transmission throttle valve 394 thus develops in the throttle pressure port 532 a throttle pressure Pt which is continuously variable with the amount of displacement of the valve plunger 554 from the limit axial position thereof and accordingly with the degree to which the carburetor throttle valve is made open by the accelerator pedal 566.

When the transmission gear shift valve is in the manual second forward drive range position "2", the line pressure appearing at the fourth line pressure outlet port 174 of the manually operated gear position selector valve 160 is directed through the passageway 408 and the ports 504 and 506 of the kickdown valve 500 and also to the second line pressure port 402 of the throttle back-up valve 396. There being no fluid pressure in the first line pressure port 400 of the throttle back-up valve 396 under the manual second forward drive range condition, the valve spool 410 of the throttle back-up valve 396 is conditioned to assume the previously described equilibrium axial position thereof so that the throttle back-up valve 396 develops the throttle back-up pressure in the port 404 of the valve 396. The throttle back-up pressure is directed by way of the fluid passageway 542 to the throttle back-up pressure port 536 of the transmission throttle valve 394. When the throttle back-up pressure higher than the normal throttle pressure Pt appears at the throttle back-up pressure port 536 of the transmission throttle valve 394 which has been held in these conditions, the throttle back-up pressure is admitted from the port 536 into the throttle pressure port 532 and thereafter into the throttle pressure feedback port 534 of the valve 394. The throttle back-up pressure thus developed in the throttle back-up pressure port 534 enters the space between the valve spool 544 and the plug portion 558 of the valve plunger 554 and causes the valve spool 544 to slightly move toward the previously mentioned second axial position thereof beyond the equilibrium axial position in which the valve spool 544 has been maintained. It therefore follows that the line pressure port 530 of the throttle valve 394 is fully closed by the second circumferential land 548 and sustained fluid communication is established between the first throttle pressure port 532 and the throttle back-up pressure port 536 of the throttle valve 394. The throttle back-up pressure obtaining in the throttle back-up pressure port 536 is therefore passed, without being modified or modulated, to the first throttle pressure port 532 and through this throttle pressure port 532 delivered to the throttle pressure circuit 446. The throttle back-up pressure higher than the normal throttle pressure is distributed through the throttle pressure circuit 446 to the throttle pressure port 148 of the line pressure booster valve 146 and causes the pressure regulator valve 94 to develop a boosted line pressure so that each of the control valves contributing to the manual second forward drive range condition of the hydraulic control system is enabled to be quickly responsive to the fluid pressures acting thereon. When the transmission gear shift lever is moved from the manual second forward drive range position "2" to the manual first forward drive range position "1", the line pressure developed in the fifth line pressure outlet port 176 of the manually operated gear position selector valve 160 is passed through the first line pressure inlet and outlet ports 282 and 284 of the first-second gear shift valve 276 and by way of the low-and-reverse brake actuating fluid circuit 300 to the first line pressure port 400 of the throttle back-up valve 396 and, through the radial and axial passgeways in the valve spool 410 of the valve 396, causes the valve spool 410 to move into the second axial position thereof from the equilibrium axial position in which the valve spool 410 has been maintained throughout the manual second forward drive range condition. The line pressure being still maintained in the second line pressure port 402, the valve spool 410 of the throttle back-up valve 396 is held in the second axial position thus reached and maintains the throttle back-up pressure port 404 drained through the drain port 406 of the valve 396. As a consequence, the throttle back-up pressure which has been developed in the throttle back-up pressure port 536 of the transmission throttle valve 394 is discharged through the passageway 542 and the ports 404 and 406 of the throttle back-up valve 396 and allows the transmission throttle valve 394 to develop a throttle pressure in the throttle pressure circuit 446.

What is claimed is:

1. In a hydraulic control system for an automatic power transmission for an automotive vehicle including an acceleration producing member movable into and out of a released position, a transmission throttle valve for producing a fluid pressure variable with the displacement of the acceleration producing member from the released position thereof, comprising:

a wall portion formed with a valve chamber having at least one open axial end;

a first movable member axially slidable through the valve chamber and formed with an axial bore which is open at both ends, the first movable member having a pressure acting area to be acted upon by said fluid pressure;

a second movable member axially slidable through the bore in said first movable member and mechanically engaging the acceleration producing member for being axially moved in a predetermined direction with respect to the wall portion; and resilient biasing means engaging the first and second movable members for urging the first and second movable members to axially move in opposite directions relative to each other, the direction in which the second movable member is urged to move by the biasing means being coincident with said predetermined direction, the second movable member having a laterally enlarged axial portion axially slidable in said valve chamber and forming a variable-volume space between the enlarged axial portion and said pressure acting area of the first movable member;

said first movable member having first and second lateral lands axially spaced apart from each other and arranged to be respectively closer to said open axial end and said enlarged axial portion of said second movable member;

the second movable member having an axial end portion constantly projecting from the axial bore in the first movable member and the valve chamber in the wall portion;

said resilient biasing means comprising a spring seat element fixedly mounted on said axial end portion of the second movable member and a helical compression spring seated at one end of said spring seat element and at the other end on the axially outer end face of said first lateral land; and said pressure acting area of the first movable member being formed at least in part by the axially outer end face of said second lateral land.

2. In an automotive vehicle, a transmission throttle valve for an automatic power transmission of said vehicle, said transmission having a source of hydraulic pressure, comprising:

a valve body having a first through bore formed therein, an inlet port formed in said valve body which provides fluid communication between said source of hydraulic pressure and said first through bore, an outlet port formed in said valve body so as to fluidly communicate with said first through bore, a first spool reciprocatively received in said first through bore, said first spool being formed with first and second lands which define a closed chamber within said first through bore, said first spool having a second through bore formed therethrough, a second spool having a shaft portion which is reciprocatively received in said second through bore and a third land at a first end of said shaft portion, said second spool being disposed with said first spool so that said third land is located adjacent the first land of said first spool to define a variable volume chamber therebetween, a feedback port formed in said valve body which provides fluid communication between said outlet port and said variable volume chamber, a spring seat element fixed to said shaft portion at the second end thereof, a helical compression spring disposed about said first spool so as to abut at one end thereof said second land and at the other end thereof said spring seat element, said spring biasing said first and second spools in opposite directions so as reduce the volume of said variable volume chamber, and means formed on said shaft portion outboard of said spring seat element for providing a mechanical linkage between said second spool and an accelerator pedal of said vehicle, the arrangement of the foregoing being such that, as the accelerator pedal is depressed, the first spool is moved to increase the compression of said spring which in turn moves said second spool to increase the communication between said inlet and outlet ports via said closed chamber, whereby the pressure fed to said variable volume chamber from said outlet port increases thus expanding said variable volume chamber to compress said spring and reduce the force required to depress the accelerator pedal.

* * * * *